US012649591B2

(12) United States Patent
Wade

(10) Patent No.: US 12,649,591 B2
(45) Date of Patent: Jun. 9, 2026

(54) REDUCED NOISE ROTOR FOR AERIAL VEHICLES

(71) Applicant: Zipline International Inc., South San Francisco, CA (US)

(72) Inventor: Brendan J.D. Wade, South San Francisco, CA (US)

(73) Assignee: Zipline International Inc., South San Francisco, CA (US)

( * ) Notice: Subject to any disclaimer, the term of this patent is extended or adjusted under 35 U.S.C. 154(b) by 0 days.

(21) Appl. No.: 18/832,957

(22) PCT Filed: Jan. 26, 2023

(86) PCT No.: PCT/US2023/011585
§ 371 (c)(1),
(2) Date: Jul. 25, 2024

(87) PCT Pub. No.: WO2023/146938
PCT Pub. Date: Aug. 3, 2023

(65) Prior Publication Data
US 2025/0162736 A1    May 22, 2025

Related U.S. Application Data

(60) Provisional application No. 63/304,402, filed on Jan. 28, 2022.

(51) Int. Cl.
*B64U 30/24* (2023.01)
*B64C 11/48* (2006.01)
(Continued)

(52) U.S. Cl.
CPC .............. *B64U 20/20* (2023.01); *B64C 11/48* (2013.01); *B64C 27/467* (2013.01); *B64U 10/20* (2023.01); *B64U 30/24* (2023.01)

(58) Field of Classification Search
CPC ........ B64C 11/48; B64C 11/271; B64U 30/24
See application file for complete search history.

(56) References Cited

U.S. PATENT DOCUMENTS 10,232,933 B2 * 3/2019 Roberts ................. B64C 11/306
10,800,517 B1 10/2020 Coralic et al.
(Continued)

FOREIGN PATENT DOCUMENTS

CN      109878711 A  * 6/2019  ............. B64C 27/10
EP      3459843 B1    8/2020
KR      20180008093 A  1/2018

OTHER PUBLICATIONS

Examination Report No 1 dated May 19, 2025 in connection with Australian Patent Application No. 2023211582, 4 pages.
(Continued)

*Primary Examiner* — Timothy D Collins
*Assistant Examiner* — Terri L Filosi
(74) *Attorney, Agent, or Firm* — Dorsey & Whitney LLP

(57) ABSTRACT

An aerial vehicle is disclosed including a rotor assembly having a downstream blade and a upstream blade. The downstream and upstream blades are configured to rotate about an axis of rotation. The downstream blade may be arranged extending outward from the axis of rotation along a downstream blade orientation. The upstream blade may be arranged extending outwards from the axis of rotation along a upstream blade orientation that is non-orthogonal to the downstream blade orientation. The downstream blade and the upstream blade may be axially offset from one another along the axis of rotation.

19 Claims, 15 Drawing Sheets

(51) Int. Cl.

| | |
|---|---|
| *B64C 27/467* | (2006.01) |
| *B64U 10/20* | (2023.01) |
| *B64U 20/20* | (2023.01) |

(56) References Cited

U.S. PATENT DOCUMENTS

| | | | |
|---|---|---|---|
| 2010/0206982 A1 | 8/2010 | Moore et al. | |
| 2017/0274983 A1* | 9/2017 | Beckman | B64C 11/50 |
| 2017/0274993 A1 | 9/2017 | Beckman et al. | |
| 2019/0135425 A1 | 5/2019 | Moore et al. | |
| 2021/0253231 A1 | 8/2021 | Ensslin | |
| 2021/0316851 A1 | 10/2021 | Ensslin | |

OTHER PUBLICATIONS

International Search Report and Written Opinion dated Jul. 20, 2023 in connection with International Patent Application No. PCT/US2023/011585, 15 pages.
Extended European Search Report dated Jul. 23, 2025 in connection with European patent application No. 23747579.3, 9 pages.

* cited by examiner

1100

1104

CAUSE A FIRST BLADE AND A SECOND BLADE OF A ROTOR ASSEMBLY TO ROTATE ABOUT AN AXIS OF ROTATION, THE FIRST BLADE BEING NON–ORTHOGONAL TO THE SECOND BLADE

1108

CAUSE THE FIRST AND SECOND BLADE TO STACK RELATIVE TO ONE ANOTHER WITH THE FIRST BLADE SUBSTANTIALLY POSITIONED WITHIN A FOOTPRINT OF THE SECOND BLADE RELATIVE TO THE AXIS OF ROTATION

REDUCED NOISE ROTOR FOR AERIAL VEHICLES

CROSS-REFERENCE TO RELATED APPLICATIONS

This application is a national stage application of International Patent Application No. PCT/US2023/011585, filed Jan. 26, 2023 titled Reduced Noise Rotor for Aerial Vehicles, which claims the filing benefit of U.S. Provisional Application No. 63/304,402, filed Jan. 28, 2022 titled Reduced Noise Rotor for UAV, each of which is incorporated by reference herein in its entirety and for all purposes.

FIELD

The described examples relate generally to aerial vehicles and systems and methods of operation thereof.

BACKGROUND

Aerial vehicles, such as airplanes, helicopters, and unmanned aerial vehicles (UAVs), such as drones, rely on a lift assembly (e.g., propellers and rotor) to generate lift and movement in the air. As aerial vehicles, and unmanned aerial vehicles, become more ubiquitous (e.g., use for package delivery vehicles, aerial photography, and by hobbyists), mechanical and operational requirements for a lift assembly may be as important as the noise and frequency of noise generated by such assemblies. More specifically, excess noise and high frequency noises generated by unmanned aerial vehicles may interfere with ground environments and generally hinder the adoption of unmanned aerial vehicles for package delivery. For example, excess noise and high frequency noises may be irritating to package recipients, exceed noise regulations, or the like, depending on the area for delivery (e.g., residential or urban areas).

As such, there is a need for systems and techniques to reduce the noise and noise frequency generated by aerial vehicle operations.

SUMMARY

Examples of the present invention are directed to reduced-noise rotor assemblies and methods of use for unmanned aerial vehicles or autonomous vehicles.

In one example, an aerial vehicle is disclosed. In some examples, the aerial vehicle may be autonomous, for example, an unmanned aerial vehicle. The aerial vehicle includes a rotor assembly having a downstream blade and an upstream blade. The downstream and upstream blades are configured to rotate about an axis of rotation. The downstream blade is arranged extending outward from the axis of rotation along a downstream blade orientation. The upstream blade is arranged extending outwards from the axis of rotation along an upstream blade orientation that is non-orthogonal to the downstream blade orientation.

In another example, the downstream blade may axially offset relative to the upstream blade. The upstream blade may define a leading edge of the rotor assembly. The downstream blade orientation may be defined by an angular spacing trailing relative to the leading edge. The angular spacing may be between 15° and 75°, for example, such as being about 60°, in one example. The rotor assembly may be configured to maintain the angular spacing during rotation of the downstream and upstream blades about the axis of rotation. The downstream and upstream blades may be axially offset by between 1%-10% of a diameter of the rotor assembly. In one example, the axial offset is about 30 mm or less.

In another example, the angular spacing and the axially offset cooperate to limit noise of the rotor assembly to a predefined decibel range for a given hovering altitude above payload a delivery location. In some cases, the angular spacing and the axial offset may have a codependent relationship and are optimized to reduce noise output by the rotor assembly.

In another example, the upstream blade may induce a first helix of airflow during rotation about the axis of rotation. Further, the downstream blade may induce a second helix of airflow during rotation about the axis of rotation. In this regard, the angular spacing and the axial offset cooperate to limit noise of the rotor assembly by aligning the second helix of airflow within a wake of the first helix of airflow, e.g., the downstream blade may effectively be "hidden" within the wake of the upstream blade. Further, the angular spacing may be optimized to reduce noise output by the rotor assembly by separating an amplitude of a first tone output by the upstream blade and an amplitude of a second tone output by the downstream blade such that the amplitudes of the first and second tones, respectfully, are not substantially additive at the same frequencies bands of each tone. In this manner, while there may be separate output responses from each of the blades, each of the two output responses may be lower than conventionally "additive" blade arrangements, reduce the overall magnitude of the generated sound.

In another example, the rotor assembly may further include a motor shaft configured to rotate about the axis of rotation, the upstream blade fixed to the motor shaft. The rotor shaft may further include a rotor shaft keyed to one or both of the upstream blade or the motor shaft for rotating about the axis of rotation with the upstream blade, the downstream blade fixed to the rotor shaft.

In another example, in response to a cessation of the rotation of the downstream and upstream blades about the axis of rotation, the rotor shaft may be configured to change the axial offset between the downstream blade and the upstream blade. The rotor shaft may rotationally retract to a lower stop position at which the downstream blade orientation is substantially parallel with the upstream blade orientation.

In another example, the downstream blade and the upstream blade may be axially offset relative to the axis of rotation.

In another example of the rotor assembly the upstream blade may be located on a first side relative to the axis of rotation and the downstream blade may be in a spaced relationship with the upstream blade and located on the first side relative to the axis of rotation.

In another example, a mass portion may be located on a second side relative to the axis of rotation and wherein during operation of the rotor assembly forces on the mass portion may counter forces on the upstream blade and downstream blade relative to the axis of rotation.

In another example, the spaced relationship may define an angle between the first blade and the second blade, wherein a longitudinal axis may be defined as extending from a midpoint of the angle through the axis of rotation and where the mass portion is offset from the longitudinal axis.

In another example, the spaced relationship may define a height, wherein a latitudinal axis may be defined as extending from a midpoint of the height through the axis of rotation and where the mass portion may be offset from the latitudinal axis.

In another example, the rotor assembly may tilt relative to the rotational axis.

In another example, the upstream blade may have a first length, the downstream blade may have a second length, and the mass portion may have a third length, the third length less than the first length and second length.

In another example, the rotor assembly may include a teeter assembly providing a degree of freedom for the rotor assembly to tilt relative to the axis of rotation about a bisecting line, wherein the bisecting line separates the first side from the second side.

In another example, during forward flight the asymmetric rotor may align with the mass portion toward a direction of flight.

In another example, the rotor assembly may align automatically based on air forces experienced on the asymmetric rotor during forward flight.

In another example, each of the upstream blade and downstream blade may define a varying pitch having a first pitch at a first distance from the axis of rotation is different from a second pitch at a second location from the axis of rotation, wherein the first location is spaced from the second location along each blade orientation.

In another example, the rotor assembly may include a teeter assembly, wherein the teeter assembly allows the asymmetric rotor to change an alignment relative to the axis of rotation.

In another example, an aerial vehicle is disclosed. The aerial vehicle includes a rotor assembly having a downstream blade and a upstream blade. The downstream and upstream blades are configured to rotate about an axis of rotation. Further, in a first compact configuration, the rotor assembly is configured to maintain the downstream and upstream blades substantially within a footprint of one another relative to the axis of rotation. Further, in a second deployed configuration, the rotor assembly is configured to maintain the downstream blade at least partially outside of a footprint of the upstream blade relative to the axis of rotation.

In another example, in the second deployed configuration, the rotor assembly may be configured to maintain the downstream blade non-orthogonal to the upstream blade. For example, in the first compact configuration, the rotor assembly may be configured to maintain the downstream and upstream blades stacked relative to, and contacting, one another. Further, in the second deployed configuration, the rotor assembly may be configured to maintain the downstream blade at an axial offset from the upstream blade relative to the axis of rotation.

In another example, the rotor assembly further includes a rotor shaft fixed to the downstream blade. Additionally, the rotor shaft may be biased toward the first compact configuration. In some cases, the rotation of the downstream and upstream blades by the rotor assembly may cause the rotor shaft to overcome the bias such that the downstream blade is maintained at least partially outside of the footprint of the upstream blade relative to the axis of rotation.

In another example, the rotor assembly may further include a motor shaft configured to rotate about the axis of rotation. The upstream blade may be fixed to the motor shaft. The rotor shaft may be received, and define a keyed pathway with, one or both of the upstream blade or the motor shaft. In this regard, the rotor shaft may be rotationally extendable from the one or both of the upstream blade or the motor shaft along the keyed pathway to an upper stop position at which the downstream blade is non-orthogonal to, and axially offset from, the upstream blade.

In another example, a method is disclosed. The method includes causing a downstream blade and a upstream blade of a rotor assembly to rotate about an axis of rotation. The downstream blade is arranged extending outward from the axis of rotation along a downstream blade orientation and the upstream blade is arranged extending outward from the axis of rotation along a upstream blade orientation that is non-orthogonal to the downstream blade orientation. The method further includes causing the downstream and upstream blades to stack relative to one another with the downstream blade substantially positioned within a footprint of the upstream blade relative to the axis of rotation.

In another example, the causing of the downstream blade and the upstream blade of the rotor assembly to rotate further comprises maintaining an axial offset of the downstream blade from the upstream blade relative to the axis of rotation. In this regard, the causing of the downstream blade and the upstream blade of the rotor assembly to rotate may further include maintaining the downstream blade orientation non-orthogonal to the upstream blade orientation to an angular offset of 15° to 75°.

In another example, the causing of the downstream and upstream blades to stack relative to one another further includes ceasing the causing of the downstream blade and the upstream blade of the rotor assembly to rotate and allowing a bias of the downstream blade toward the upstream blade to stack the downstream blade relative to the upstream blade. In this regard, the causing the downstream and upstream blade to stack relative to one another may further include directing the downstream blade along a keyed pathway to rotationally transition the downstream blade from the downstream blade orientation being non-orthogonal the upstream blade orientation to the downstream blade orientation being substantially parallel the upstream blade orientation.

In one example, an aerial vehicle is disclosed. The aerial vehicle includes an asymmetric rotor configured to rotate about an axis of rotation, the asymmetric rotor including first blade located on a first side relative to the axis of rotation, a second blade in a spaced relationship with the first blade and located on a first side relative to the axis of rotation, and a mass portion located on a second side relative to the axis of rotation. During operation of the asymmetrical rotor forces on the mass portion counter forces on the first blade and the second blade relative to the axis of rotation.

In another example of the aerial vehicle, the spaced relationship may define an angle between the first blade and the second blade. A longitudinal axis may be defined as extending from a midpoint of the angle through the axis of rotation and where the mass portion may be offset from the longitudinal axis.

In another example of the aerial vehicle, the spaced relationship may define a height and a latitudinal axis may be defined as extending from a midpoint of the height through the axis of rotation. The mass portion may be offset from the latitudinal axis.

In another example of the aerial vehicle, the asymmetric rotor may tilt relative to the rotational axis.

In another example of the aerial vehicle, the first blade may have a first length, the second blade may have a second length, and the mass portion may have a third length. The third length may be less than the first length and second length.

In one example, an aerial vehicle is disclosed. In some examples, the aerial vehicle includes an asymmetric rotor configured to rotate about an axis of rotation. The asymmetric rotor including two blades arranged on a first side of a bisecting line, the bisecting line extending through the axis of rotation at a perpendicular orientation, and a mass portion on a second side of the bisecting line and configured to counter forces of the two blades.

In another example of the aerial vehicle, the mass portion may balance forces on the blades relative to the axis of rotation.

In another example of the aerial vehicle, the asymmetric rotor may include a teeter assembly providing a degree of freedom for the asymmetric rotor to tilt relative to the axis of rotation about the bisecting line.

In another example of the aerial vehicle, during forward flight the asymmetric rotor may align with the mass portion toward a direction of flight.

In another example of the aerial vehicle, the asymmetric rotor may align automatically In another example of the aerial vehicle, each of the two blades may define a varying pitch having a first pitch at a first distance from the axis of rotation different from a second pitch at a second location from the axis of rotation, wherein the first location may be spaced from the second location along a blade orientation.

In another example of the aerial vehicle, the aerial vehicle may further include a teeter assembly that may allow the asymmetric rotor to change an alignment relative to the axis of rotation.

In one example of the aerial vehicle, the aerial vehicle includes a rotor configured to rotate about an axis of rotation. The rotor includes at least two blades including outer most blades spaced by less than 180 degrees relative to the axis of rotation, and wherein all of the at least two blades are located between the outer most blades.

In one example, an aerial vehicle is disclosed. The aerial vehicle includes a rotor configured to rotate about an axis of rotation. The rotor includes two blades arranged on a first side of a bisecting line, the bisecting line extending through the axis of rotation at a perpendicular orientation, and a mass portion on a second side of the bisecting line and configured to counter blade forces of the two blades with mass forces. The aerial vehicle also including a teeter assembly allowing the rotor to tilt relative to the axis of rotation to assist in balancing the blade forces and the mass forces.

In addition to the exemplary aspects and examples described above, further aspects and examples will become apparent by reference to the drawings and by study of the following description.

DETAILED DESCRIPTION

Figure 1:
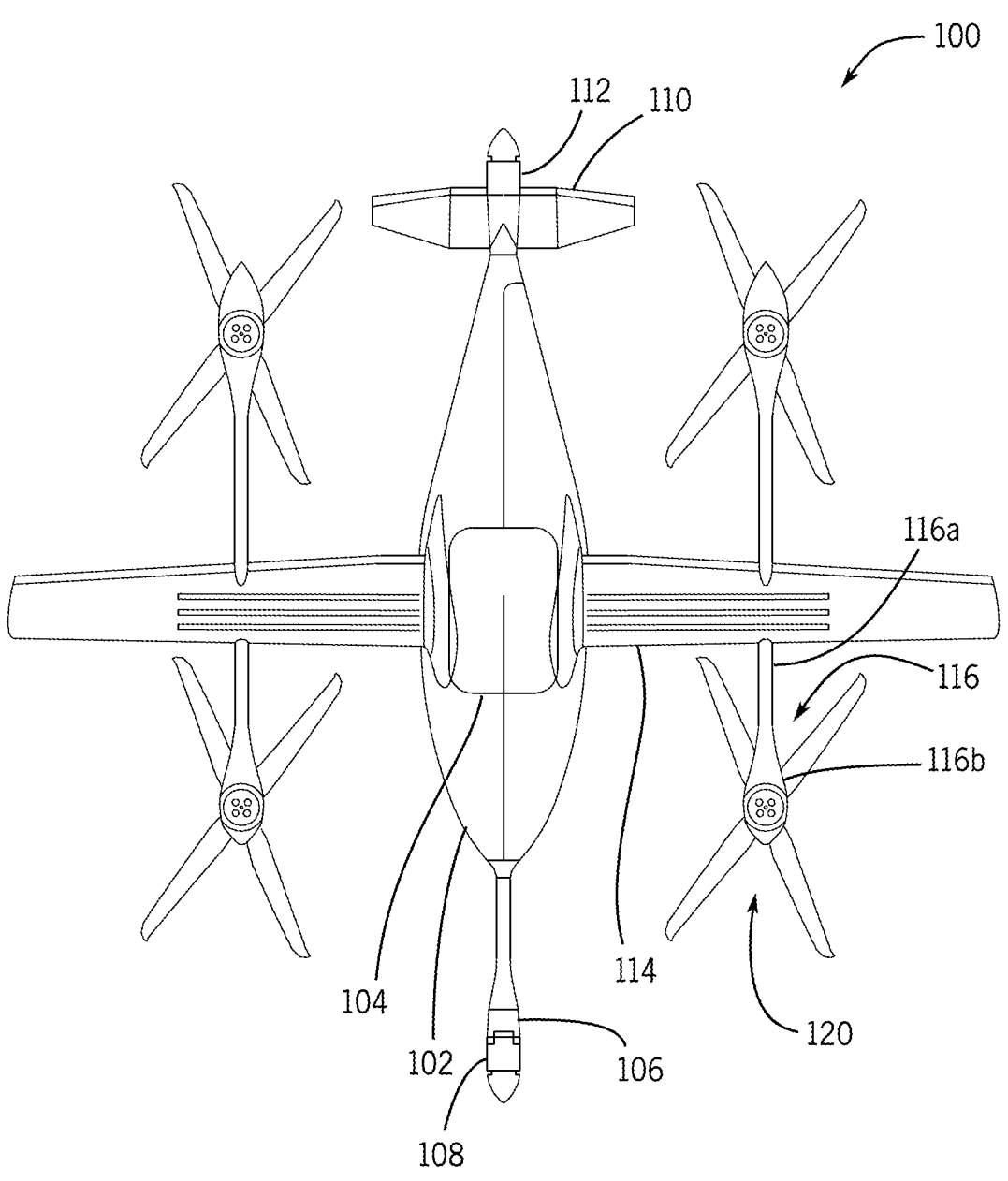
FIG. 1 depicts an unmanned aerial vehicle.

The description that follows includes sample systems, methods, and apparatuses that embody various elements of the present disclosure. However, it should be understood that the described disclosure may be practiced in a variety of forms in addition to those described herein.

The following disclosure relates generally to aerial vehicles, such as, both manned or unmanned aerial vehicles, or autonomous aerial vehicles more generally, advanced air mobility vehicles (e.g. flying taxis), and associated systems and methods of use thereof. An aerial vehicle may also include substantially any type of vehicle operated in an autonomous or semi-autonomous manner, including those are that configured to carry and/or release a payload. It should be noted that although various embodiments are discussed with respect to AVs and UAVs, the embodiments are equally applicable to all types of vehicles and devices requiring a rotor or propeller assembly, including, but not limited to, airplanes, helicopters, or other types of manned aerial vehicles, as well as boats and watercraft, windmills, or related vehicles or devices. A UAV may include a rotor assembly or other propulsion system allowing the UAV to maintain flight operations, including hovering, forward motion, and/or backward motion.

The unmanned aerial vehicles and aerial vehicles of the present disclosure may include a rotor assembly with a reduced-noise output. For example, the rotor assembly may include a blade configuration and spacing that permits the unmanned aerial vehicle to operate with substantially reduced noise. The reduced noise output allows the aerial vehicle, such as the UAV, to operate in areas where noise may be problematic or undesired, such as within residential zones, as well as at lower altitudes, and in other noise-sensitive environments, that may otherwise be inaccessible or restricted using conventional unmanned aerial vehicle rotor arrangements. In this regard, the unmanned aerial vehicles described herein may be adaptable to a wider variety of use cases and payload delivery usages due in part to the reduced-noise operation. Additionally, in many instances, the rotor assembly may be configured to increase efficiency over conventional propulsion systems, allowing a quieter and more efficient flight.

In one example, the rotor assembly may be an asymmetric rotor assembly and may include an asymmetric rotor. As used herein, the term asymmetric rotor may generally encompass a rotor that lacks rotational symmetry. Rotational symmetry may be defined as a rotor having a common blade pattern rotated by 180 degrees from any perspective. In various embodiments, In one example, the asymmetric rotor may include two or more blades balanced or positioned opposite of a mass portion. In some embodiments, the asymmetric rotor may also include a teeter assembly, the mass portion may act to balance forces on the rotor and counter moments generated by the blades allowing the rotor to eliminate blades without becoming unbalanced. For example, two blades may be oriented as if in a four blade configuration, but with the two opposite blades being omitted. Locating the blades in an asymmetric orientation (e.g., on a same side of the rotational axis), may effectively reduce the blade pass frequency, or frequency at which a blade or blades rotate through a location relative to the axis of rotation. For example, in a symmetrical rotor having two blades, a location in the path of the blades may have a blade pass or rotate through the location twice per rotation of the rotor. In an asymmetric rotor, where the two blades are located closer together, that same location would effectively have blades pass through in a manner comparable to only a single blade passing that same location per rotation of the asymmetric rotor as a whole. As a result, the blade pass frequency may be effectively reduced for a given rotational frequency of the rotor as a whole. By reducing the effective blade pass frequency, the sound frequency and the total sound generated by the blades may be reduced. As a result, an asymmetric rotor may have a reduced total noise output and a less intrusive noise output, which may be beneficial in populated locations.

The asymmetric rotor may also have additional benefits. For example, the drag force on the asymmetric rotor during rotation may be reduced due to the reduced surface area of asymmetric rotor compared to a symmetrical rotor having blades of a similar size and shape. Further, in aerial vehicles where the rotors are used for stationary flight, and alternative propulsion systems are used for forward flight, the asymmetric rotors may have a profile that reduces drag forces on the blades during forward flight. In forward flight, the asymmetric rotor may align relative to the aerial vehicle with the mass portion in the forward direction (e.g., towards a direction of forward flight, such as towards the front end of the UAV) and the blades in the rear direction (e.g. facing away from the direction of forward flight, such as towards a tail end of the UAV). In this position, the asymmetric rotors may have a reduced effective surface area when compared to a symmetrical rotor. Further, with the mass portion towards the exterior of the aerial vehicle the effective spatial footprint of the aerial vehicle may be reduced. A reduced spatial footprint may reduce the amount of space needed to ship or store the aerial vehicle.

In some examples, the rotor may include a teeter assembly that enables the asymmetric rotor assembly, or portions thereof, to self-balance. A self-balancing rotor may auto align itself in a position having the least amount of drag forces, whether rotating in operation or relatively stationary in a forward flight position. A self-balancing rotor may also balance moments and forces on the rotor about the rotational axis, resulting in a more stable rotor. Self-balancing may further reduce the number of additional stabilizing mechanisms such as servos and thus reduce the total weight of the aerial vehicle, power consumption, and increase possible flight distances and efficiency of the aerial vehicle.

In another example, the rotor assembly may include two or more blades that rotate about a rotational axis. In some instances, there may be pairs of blades that are positioned both axially and angularly relative to one another during rotation such that that rotor assembly may produce lift with a reduced-noise output. For example, a downstream blade and an upstream blade may be arranged to define a "scissor-type" configuration during the rotation of the pair of the blades about the rotational axis, e.g., may be non-orthogonal to one another during the rotation about the axis. Additionally or alternatively, the two blades may be axially offset from one another along the axis of rotation during the rotation of the blades about the axis.

In embodiments where the blades are both spaced apart axially and arranged off axis (non-orthogonal) the rotor has a reduce-noise output for a given amount of lift. For example, the upstream blade may induce a first helix of air flow during rotation. The blades may be configured to reduce noise and increase efficiency because the second blade operates substantially within the first helix or within a wake of the first helix. For example, the downstream blade may induce a second helix of airflow during rotation about the axis that is within, or at least partially overlapping, the first helix of air flow. In this regard, rather than separately disturb the air, rotation of the downstream blade occurs at least partially within the already disturbed air of the first helix (e.g., the disturbed air induced by the rotation of the upstream blade). The arrangement of the upstream and downstream blades may be further configured to reduce noise, in part, by separating an amplitude of a tone output by each blade. For example, the upstream blade may emit a first tone during rotation and the downstream blade may emit a second tone during rotation. In light of the angular spacing of the blades, amplitudes of the tones may be separated, spectrally, and thus the amplitude of each tone is not additive and the overall sound magnitude is reduced as compared to conventional blade arrangements. Because the tones of each blade, respectively, are not additive over the same frequency bands, the overall noise output by the assembly may be reduced. While there may be separate output responses from each of the blades, each of the two output responses may be lower than conventionally "additive" blade arrangements, reducing the overall magnitude of the generated sound.

The rotor assembly may also be configured for compact storage of the blades during periods of non-use and non-rotation. For example, the blades may transition between a compact or storage position and a deployed or use configuration. The deployed configuration may include an angular and axially spaced arrangement of the blades, whereas the compact configuration the blades may be positioned adjacent, overlapping, or another configuration that reduces the spatial area or footprint of the UAV, which may reduce drag during forward flight, as well as enabling easier storage and transportation. By way of illustration, in the compact configuration, the downstream blade and the upstream blade may be generally stacked to at least partially overlap another. For example, the downstream and upstream blades may be arranged in a common footprint such that the downstream and upstream blades are generally parallel or in-line with one another or at least partially overlapping one another. Additionally or alternatively, in the compact configuration, the downstream and upstream blades may be stacked such that the axial offset of the first deployed configuration is reduced or substantially eliminated. The multiple configurations of the rotor assembly allow the unmanned aerial vehicle to have a reduced-noise output of the rotor assembly in the first deployed configuration, while also benefiting from the compact design afforded by the second compact configuration.

The blades may be fixed to different components, such as a rotor shaft and a motor shaft, respectively. The two shafts may move relative to one another, causing the two blades to move axially away and towards each other. As one example, the rotor shaft and the motor shaft may define a keyed pathway therebetween such that the motor shaft turns ahead of the rotor shaft by an angular spacing that defines a non-orthogonality of the blades. Further, the keyed pathway may extend along the axis of rotation such that one of the blades is encouraged to move axially from the other during said rotation and define the axial spacing. In other examples, other systems are contemplated and described herein, including lead-lag hinges, feather hinges, dual-motor configurations and absolution positioning sensing, among others.

Turning to the drawings, FIG. 1 depicts an underside of an unmanned aerial vehicle 100. The unmanned aerial vehicle 100 may include a fuselage 102. The fuselage 102 may define an aerodynamic body of an aircraft and provide a structural base for various lift-producing components of the unmanned aerial vehicle 100. The fuselage 102 may be a substantially hollow structure and/or include a hollow section or compartment, that can hold payloads and/or dependent vehicles. In this regard, FIG. 1 shows that the unmanned aerial vehicle 100 as including a bay section 104. The bay section 104 may extend at least partially into the fuselage 102 and define the hollow portion of the fuselage 102. The bay section 104, in one example, may be configured to hold a dependent unmanned aerial vehicle therein. A dependent unmanned aerial vehicle may generally be an unmanned aerial vehicle operable to travel to a delivery location based on, or dependent upon, the flight operations of the unmanned aerial vehicle 100, which may be known as a primary unmanned aerial vehicle. The bay section 104 may further be configured to selectively release the dependent unmanned aerial vehicle therefrom, and include various supporting subsystems, including a tether and winch-type mechanism, among other components that facilitate the selective release of the dependent unmanned aerial vehicle from the bay section 104.

With continued reference to the example unmanned aerial vehicle 100 of FIG. 1, the unmanned aerial vehicle 100 may include a forward boom 106 that extends from a forward portion of the fuselage 102. The forward boom 106 may be coupled with a forward rotor 108. The forward rotor 108 may be configured to operate and facilitate flight operations of the unmanned aerial vehicle 100, such as providing a forward propulsion mechanism. Further, the unmanned aerial vehicle 100 is shown as including a tail section 110 extending from an aft portion of the fuselage 102. The tail section 110 may be coupled with a tail rotor 112. The tail rotor 112 may also be configured to operate, such operating in coordination with the forward rotor 108, and facilitate flight operations of the unmanned aerial vehicle 100, such as providing another forward propulsion mechanism. The unmanned aerial vehicle 100 may further include a fixed wing 114. The fixed wing 114 may extend from opposing sides of the fuselage 102. Extending generally perpendicular from the fixed wing 114 may include a collection of side rotor supports 116. The side rotor supports 116 may be configured to support one or more rotor or other assemblies configured to facilitate a hovering operation of the unmanned aerial vehicle 100. In this regard, the side rotor support 116 may be arrange to position a rotor or other propulsion-type system away from the fixed wing such that a rotor may operate and support the hovering operation of the unmanned aerial vehicle 100.

In the example of FIG. 1, a side rotor support 116 may include a boom portion 116a and a rotor portion 116b. The boom portion 116a may be an elongated structure extending from one of a leading or a trailing edge of the fixed wing 114. The boom portion 116a may have a sufficient length in order to position a rotational axis of rotational components of the rotor assembly sufficiently away from the fixed wing 114. The rotor portion 116b may be coupled with, and extend from, the boom portion 116a, opposite the fixed wing 114. The rotor portion 116b may be configured to define a mount or other connection point for rotational components, motors, and the like that assist in inducing the hovering operation. For example, the rotor portion 116b may be configured to mount a motor and associated components of a rotor assembly 120, as shown in FIG. 1.

Other configurations of the unmanned aerial vehicle 100 are contemplated herein, including those with different arrangements of fuselages, wings, booms, and rotor assemblies. Further, it will be appreciated that the rotor assemblies of the present disclosure may be used with other aerial vehicles, including aerial vehicles actively piloted and/or other aerial systems. In this regard, while the rotor assembly 120 is described in additional detail below, it will be appreciated that this is for purposes of illustration. The rotor assembly 120 may be implemented in other contexts and with other aerial vehicles, including autonomous or non-autonomous vehicles and including other configurations of unmanned aerial vehicles, without departing from the scope of the disclosure herein.

The rotor assembly 120 may include an arrangement of rotatable blades configured to reduce noise output by the rotor assembly 120 and/or to improve the efficiency of the rotor assembly 120. For example, the rotor assembly 120 may generally include a downstream blade 122 and a upstream blade 132. The downstream blade 122 and the upstream blade 132 may be configured to rotate about a rotational axis 101 to generate lift used by the rotor assembly 120, e.g., to aid in hovering operations of the unmanned aerial vehicle 100 and/or other operations of the unmanned aerial vehicle 100. Rotation in such manner may generate noise, for example, due to the interaction of the downstream blade 122 and the upstream blade 132 with the surrounding air, including interactions with laminar and turbulent flows. However, the downstream blade 122 and the upstream blade 132 may be arranged relative to one another during rotation about the rotational axis in a manner configured to reduce noise.

Figure 2:
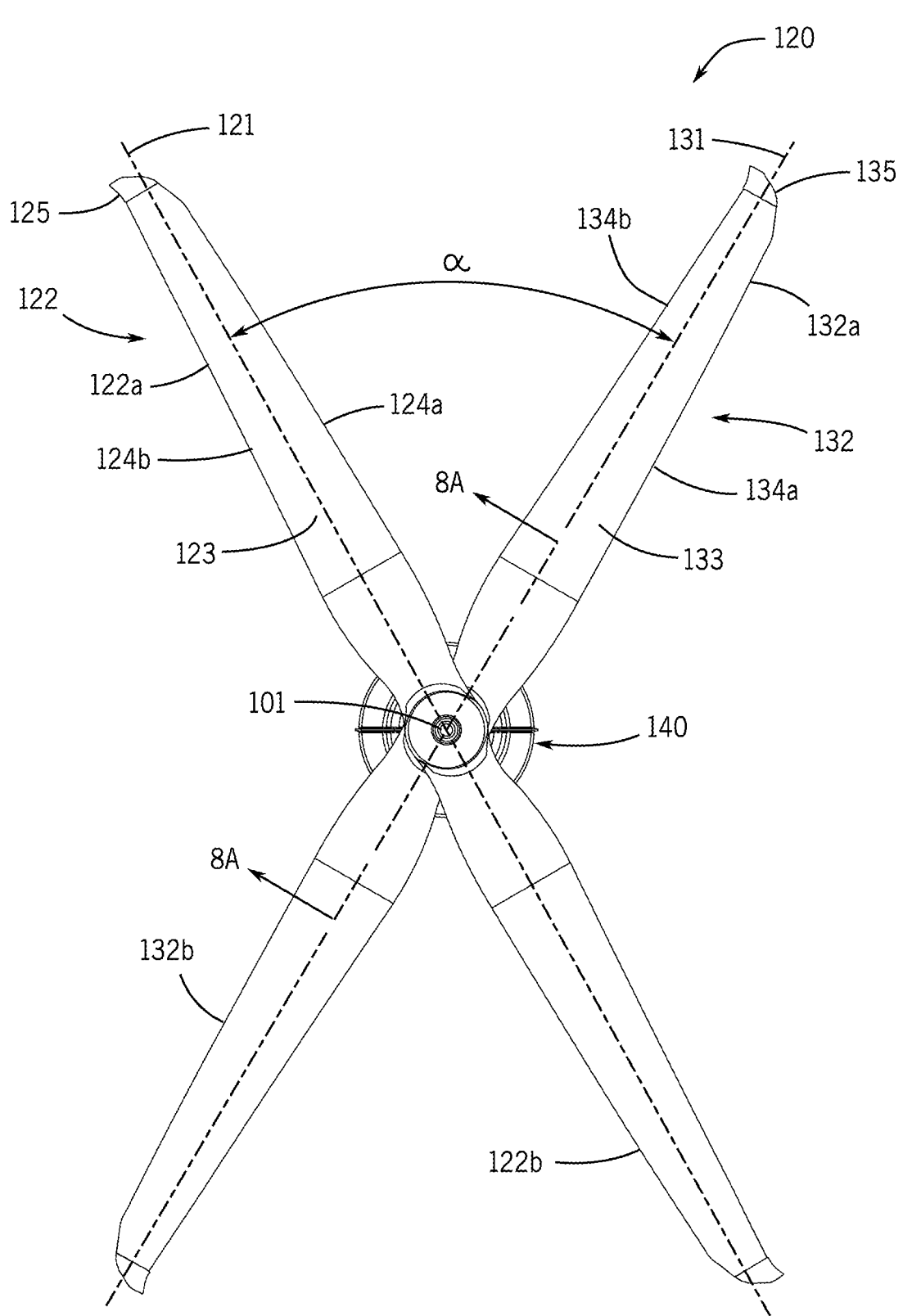
FIG. 2 depicts a top view of a rotor assembly of the unmanned aerial vehicle of FIG. 1.

In the example of FIG. 2, the upstream blade 132 and the downstream blade 122 may be configured to rotate clockwise about the axis 101. In this regard, the upstream blade 132 is upstream of the downstream blade 122, which rotates or follows the rotation of the upstream blade 132. As further shown in FIG. 2, the upstream blade 132 is positioned axially below the downstream blade 122. For example, the downstream blade 122 is arranged adjacent an end of the rotor assembly 120 relative to the upstream blade 132. As described herein, the rotor assembly 120 may be configured to reduce noise, in part, due to the downstream blade 122 operating or "hiding" in the wake or helix of air induced by the rotation of the upstream blade 132. By arranging the upstream blade 132 axially below the downstream blade 122, the downstream blade 122 will encounter the helix of air induced by the upstream blade 132. For example, as the upstream blade 132 rotates, a first helix of air is induced that generally travels in a direction away from the motor assembly (to generate lift). The downstream blade 122 is axially separated from the upstream blade 132 along the direction of travel of the helix, and therefore encounters the helix during rotation. As described herein, the downstream blade 122 therefore operates in the helix formed from the operation of the upstream blade 132. This may reduce noise, in part, because the downstream blade 122 does not separately disrupt the airflow, but rather traverses the air within the already disrupted airflow induced by the upstream blade 132.

The configuration of the upstream blade 132 and the downstream blade 122 may also improve efficiency because the blades can produce an equivalent amount of lift for a lower power consumption. For example, the downstream blade 122 may encounter less resistance or drag due to the operation of the downstream blade 122 within the wake or helix of flow induced by the upstream blade 132. That is, the downstream blade 122 encounters air already disturbed and moving, and thus the downstream blade 122 does not face stagnant air that would otherwise cause a greater resistance to the downstream blade 122. Because the downstream blade 122 encounters less resistance, the downstream blade 122 (and rotor assembly 120) may require less power to operate for a given rotational speed, and corresponding lift. In some cases, this may allow the rotor assembly 120 to operate with at least a 10% great power efficiency, as compared to conventional orthogonal blades.

For example, and as is shown in FIG. 2, the downstream blade 122 may have a downstream blade orientation 121 and the upstream blade 132 may have an upstream blade orientation 131. The downstream blade 122 may extend away from the axis of rotation 101 and along the downstream blade orientation 121. Further, the upstream blade 132 may extend away from the axis of rotation 101 and along the upstream blade orientation 131. The rotor assembly 120 may be configured such that the downstream blade 122 and the upstream blade 132 are non- orthogonal to one another. For example, during rotation, the downstream blade 122 and the upstream blade 132 may generally maintain an angular spacing a, as may be defined between the downstream blade orientation 121 and the upstream blade orientation 131. In some examples, the angular spacing a may be between 15° and 75°, for example, such as being around 70°, such as optimally being around 60°, and in some cases, being around 50°. The non-orthogonality of the downstream blade 122 and the upstream blade 132 during rotation may help reduce noise output by the rotor assembly 120.

Figure 3:
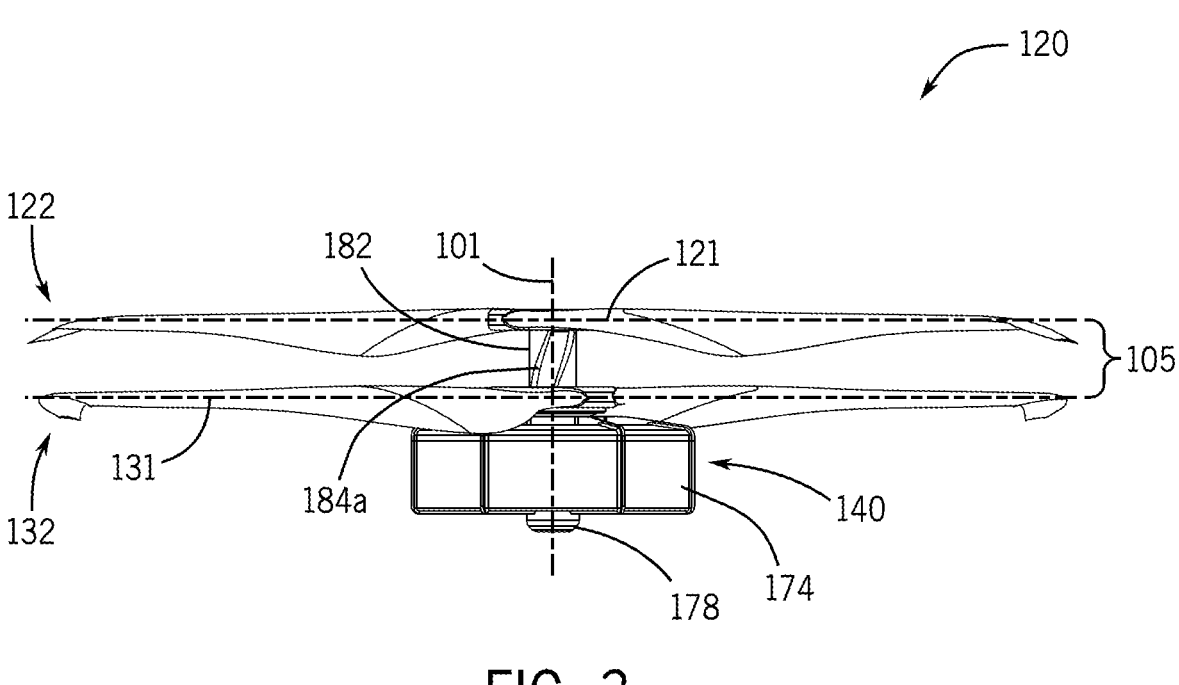
FIG. 3 depicts a side view of the rotor assembly of FIG. 2 in a deployed configuration.

The downstream blade 122 and the upstream blade 132 may be further arranged at an axial offset. For example, and as shown in FIG. 3, the downstream blade 122 and the upstream blade 132 may be separated from one another by an axially offset 105 along the rotational axis 101, with the upstream blade 132 being positioned below the downstream blade 122. The axial offset 105 or vertical spacing may be maintained during rotation of the blades. In some examples, axial offset 105 may be around 1% to 10% of the rotor assembly diameter. In various examples, the axial offset may be 50 mm or less, such as being around 40 mm or less, such as being optimally 30 mm or less, and in some cases, being 20 mm or less. The axial offset 105 of the downstream blade 122 and the upstream blade 132 during rotation may help reduce noise output by the rotor assembly 120. Additionally, the combination of the non- orthogonality and the axially offset of the downstream blade 122 and the upstream blade 132 may have certain combinative noise-reduction benefits. For example, in some cases, the non-orthogonal and axially offset combination may provide a greater noise-reduction benefit than the mere additive noise-reduction benefits provided by a non-orthogonal arrangement and an axial offset arrangement taken in isolation.

With reference to FIGS. 2 and 3, the downstream blade 122 and the upstream blade 132 are shown in a deployed configuration. In the deployed configuration of FIGS. 2 and 3, the downstream blade 122 and the upstream blade 132 may have, and substantially maintain, the angular spacing α and the offset 105. The deployed configuration may correspond to a configuration in which the downstream blade 122 and the upstream blade 132 are continually rotated about the rotational axis 101. The rotation about the rotational axis 101 in this manner may support hovering operations of the unmanned aerial vehicle 100, for example. The angular spacing α and the offset 105 may be maintained during rotation of the downstream blade 122 and the upstream blade 132.

Figure 4:
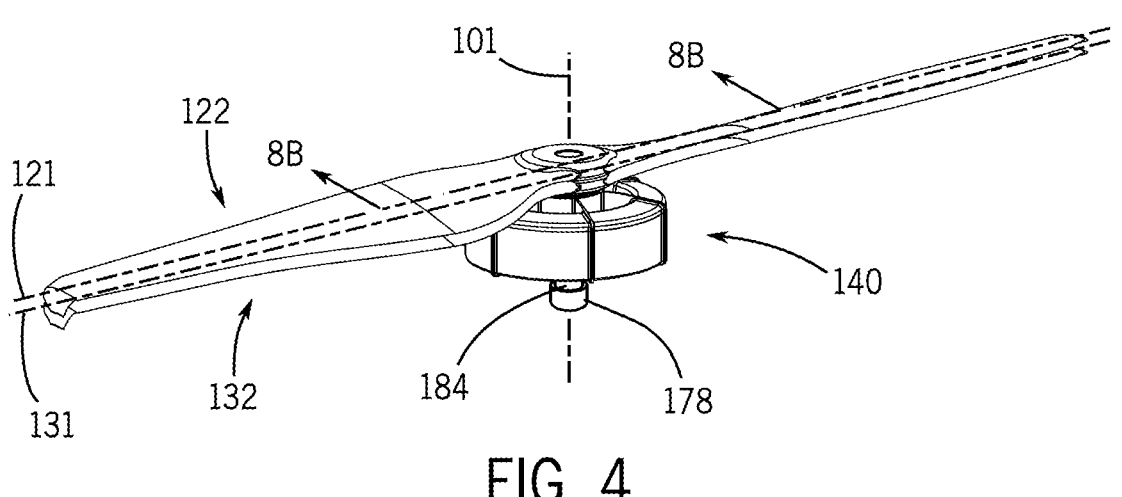
FIG. 4 depicts a side view of the rotor assembly of FIG. 2 in a compact configuration.

The downstream blade 122 and the upstream blade 132 may transition from the deployed configuration shown in FIGS. 2 and 3 to a compact configuration, as shown in FIG. 4. In the compact configuration of FIG. 4, the downstream blade 122 and the upstream blade 132 may be manipulated by the rotor assembly 120 in order to stack the blades relative to one another. By vertically stacking the downstream blades 122 and the upstream blade 132, the blades may transition from the non-orthogonal and axially offset orientation of FIGS. 2 and 3, to the arrangement shown in FIG. 4, in which the blades are generally parallel one another and contacting or otherwise stacked. For example, in the compact or storage configuration, the downstream blade orientation 121 and the upstream blade orientation 131 may run parallel or partially parallel one another such that the downstream blade 122 is positioned generally within the footprint of the upstream blade 132. The configuration of the rotor assembly 120 to transition the downstream blade 122 and the upstream blade 132 in this manner may permit the compact storage of the unmanned aerial vehicle when not used for hovering operations. For example, the scissor-type configuration of the deployed configuration may cause the blades to assume a large footprint (e.g., area) relative to the fuselage 102, whereas the compact configuration allows the blades to stack and reduce the combined footprint, which may reduce drag during forward flight. The compact configuration may also facilitate storage, particularly in confined spaces.

FIGS. 2-4 show the downstream blade 122 and the upstream blade 132 that can transition between the deployed and compact configurations. Many configurations of the downstream blade 122 and the upstream blade 132 are possible and contemplated herein. With reference to the exemplary downstream blade 122, the downstream blade 122 may include a downstream blade portion 122a, a upstream blade portion 122b, and a coupling portion 126. The downstream and upstream blade portions 122a, 122b may be generally opposing aerodynamic blades or blade portions, such as the blades or blade portions similar to those employed in a helicopter rotor. For example, the downstream and upstream blade portions 122a, 122b may be aerodynamic foils or have a foil cross-section such that traversal of the blade portions 122a, 122b through air may generate lift. The coupling portion 126 may be a central component of the downstream blade 122 configured to structurally support the blade for rotation about the axis of rotation 101. The downstream blade portion 122*a* may extend from a first side of the coupling portion 126. The upstream blade portion 122*b* may extend from a second side of the coupling portion 126 such that the downstream and upstream blade portions 122*a*, 122*b* are generally arranged along the downstream blade orientation 121. The downstream blade portion 122*a*, the upstream blade portion 122*b*, and the coupling portion 126 may collective define a blade body 123. In some cases, the downstream blade portion 122*a*, the upstream blade portion 122*b*, and the coupling portion 126 may be separate components coupled with one another. In other cases, one or all of the components of the blade body 123 may be components of an integrally formed structure.

With reference to the downstream blade portion 122*a*, the blade body 123 may define a leading edge 124*a* and a trailing edge 124*b*. The leading edge 124*a* may be the aerodynamic leading edge of an airfoil, whereas the trailing edge 124*b* may the aerodynamic trailing edge of the airfoil, such as an airfoil similar to that of helicopter blade. The downstream blade portion 122*a* is further show as including a tip 125. The tip 125 may be a terminal end of the downstream blade portion 122*a* relative to the axis of rotation 101. In some cases, the tip 125 may extend along a different plane or direction as compared with the downstream blade orientation 121. The upstream blade portion 122*b* may also include a leading edge, a trailing edge, and tip similar to that of the downstream blade portion 122*a*.

The upstream blade 132 may be substantially analogous to the downstream blade 122 and include substantially similar components. In some cases, the upstream blade 132 is of substantially identical construction as that of the downstream blade 122. As shown in FIGS. 2-4, the upstream blade may include a downstream blade portion 132 a, a upstream blade portion 132*b*, a blade body 133, a leading edge 134*a*, a trailing edge 134*b*, and tip 135; redundant explanation of which is omitted here for clarity.

As shown in FIGS. 2-4, the rotor assembly 120 may further include a motor assembly 140 configured to rotate the downstream blade 122 and the upstream blade 132 about the rotational axis 101. Further, the motor assembly 140 may be configured to causes the downstream blade 122 and the upstream blade 132 to maintain a non-orthogonality during rotation, such as maintaining the angular spacing α in the deployed configuration. Further, the motor assembly 140 may be configured to cause the downstream blade 122 and the upstream blade 132 to maintain an axial offset during rotation, such as maintaining the offset 105 in the deployed configuration. Further, the motor assembly 140 may be configured to causes the downstream blade 122 and the upstream blade 132 to transition from the deployed configuration to the compact configuration, as described herein.

Figure 5:
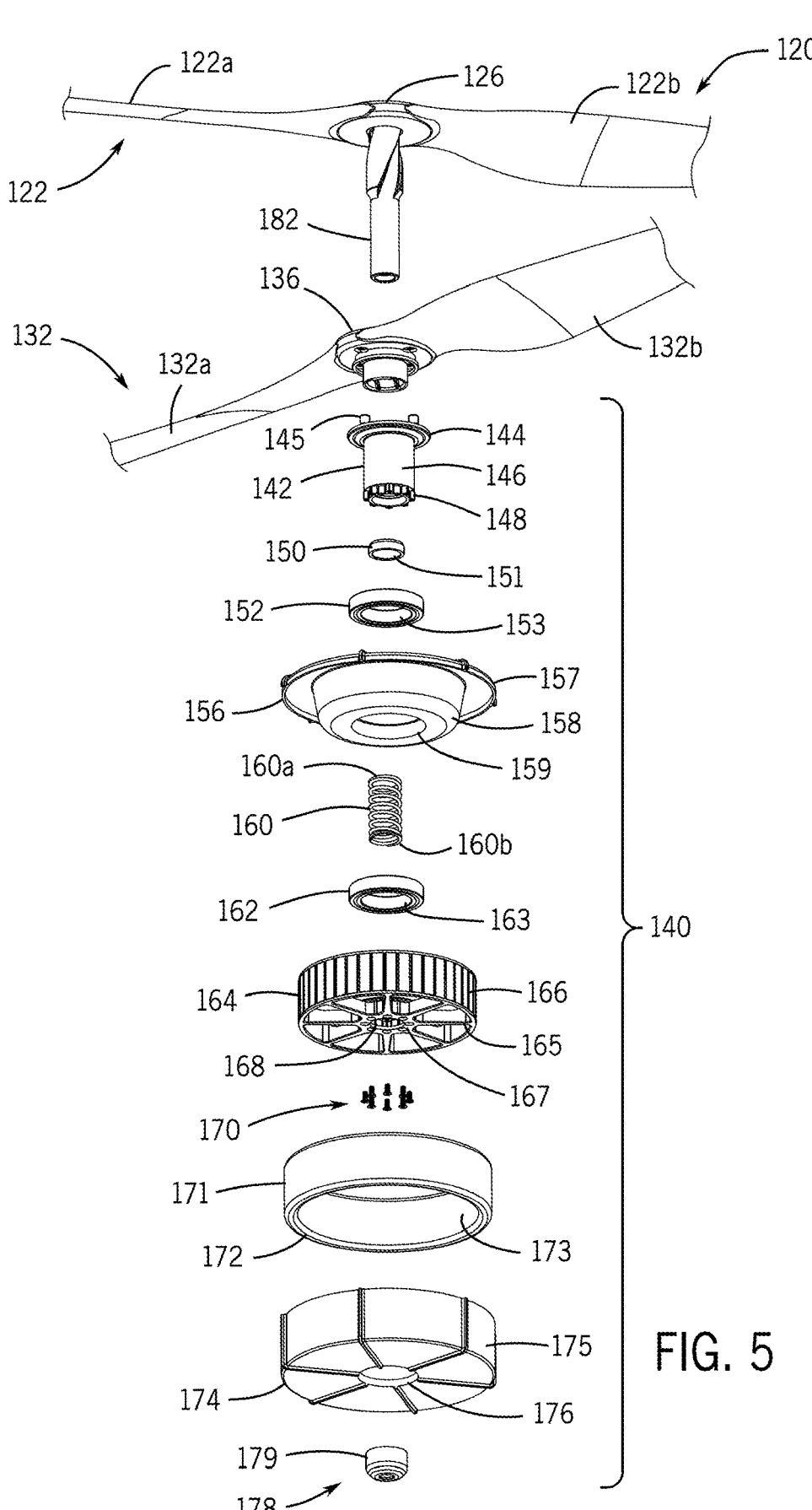
FIG. 5 depicts an exploded view of the rotor assembly of FIG. 2.
Figures 7A, 7B, 7C:
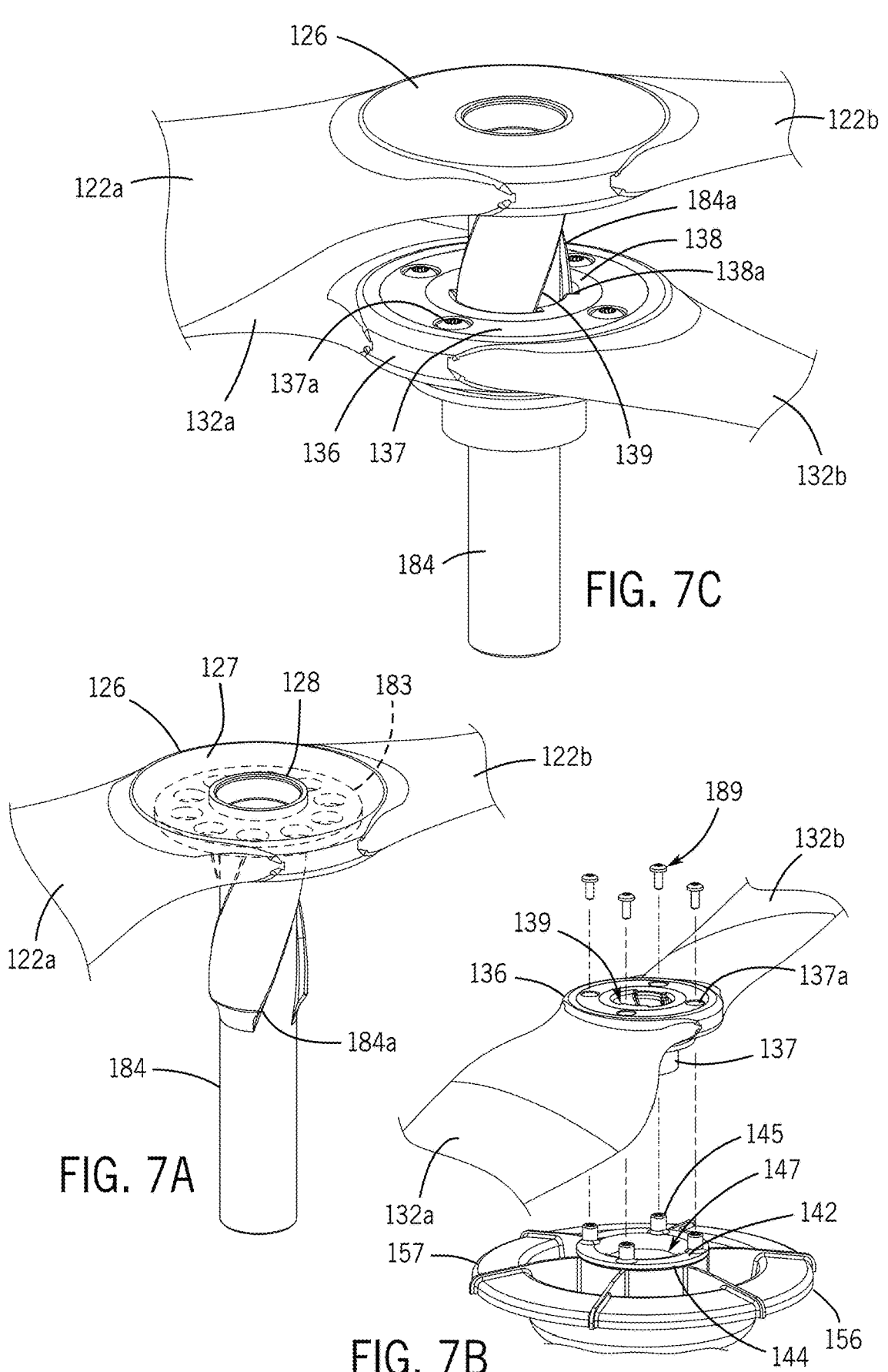
FIG. 7A depicts a downstream blade and a rotor shaft of the rotor assembly of FIG. 2.
FIG. 7B depicts an upstream blade and a motor shaft of the rotor assembly of FIG. 2.
FIG. 7C depicts an engagement of the upstream blade of FIG. 7B with the rotor shaft of FIG. 7A.

FIG. 5 shows an exploded view of the rotor assembly 120, include the motor assembly 140. The motor assembly 140 may include a motor shaft 142 having a motor shaft flange portion 144 and a motor shaft axial portion 146. The motor shaft flange portion 144 may be configured to extend radially away from the rotational axis 101 and define or include a series of engagement features 145. The series of engagement features 145 may include a plurality of posts or other features configured for engaging the motor shaft 142 with a blade of the rotor assembly 120. The motor shaft axial portion 146 may be a tube or other feature that extends from an underside of the motor shaft flange portion 144 for positioning about the rotational axis 101. The motor shaft axial portion 146 may define or include a series of rotor coupling features 148. The series of rotor coupling features 148 may include a series of threaded fittings configured for facilitating engagement of motor shaft 142 with the rotor 164, described below. The motor shaft flange portion 144 and the motor shaft axial portion 146 may cooperate to define a motor shaft axial passage 147 along the rotational axis 101, as shown in FIG. 7B.

In some examples, the motor assembly 140 may further include a support bushing 150. The support bushing 150 may include polymer bushings configured to reduce friction between rotating surfaces of the motor assembly 140. Further, the support bushing 150 may be configured to maintain a position of components relative to one another. In the example of FIG. 5, the support bushing 150 may include a bushing passage 151 through which one or more components may pass through, such as a shaft. The support bushing 150 may support friction reduction and relative positioning of a stationary or rotational component received through the bushing passage 151 and a stationary or rotational component engaged with an outer surface of the support bushing 150.

In some examples, the motor assembly 140 may further include an upper bearing 152. The upper bearing 152 may provide for rotational support between two components of the motor assembly 140. The upper bearing 152, as shown in the cross-sectional views of FIGS. 8A and 8B may include an inner race 154*a*, an outer race 154*b*, and a bearing element 155. The inner race 154*a* may rotate relative in the outer race 154*b* using the bearing element 155, which may be a ball-type bearing element. The upper bearing 152 may define an upper bearing passage 153 therethrough.

In some examples, the motor assembly 140 may further include a forward motor housing 156. The forward motor housing 156 may define a top cover of the motor assembly 140. The forward motor housing 156 may therefore be configured to cover internal components of the motor assembly 140 and shield the rotational components from the external environment. In the example of FIG. 5, the forward motor housing 156 may include a forward motor housing cap portion 157 and a forward motor housing mount portion 158. The forward motor housing cap portion 157 may extend radially out from the rotational axis 101 and define a barrier between rotational components of the motor assembly 140 and the blades 122, 132. The forward motor housing mount portion 158 may extend from an underside of the forward motor portion cap portion 157 and cooperate therewith to define a forward motor housing aperture 159.

In some examples, the motor assembly 140 may further include a biasing element 160. The biasing element 160, as shown in FIG. 5, may be a helical spring. The helical spring may have a first spring end 160*a* and a second spring end 160*b* opposite the first spring end 160*a* The first and second ends 160*a*, 160*b* may be compressible towards one another in order to store potential energy. The first and second ends 160*a*, 160*b* may release said energy and return to a relaxed state upon the compression ceasing.

In some examples, the motor assembly 140 may further include a lower bearing 162. The lower bearing 162 may define a lower bearing passage 163. The lower bearing 162 may be substantially analogous to the upper bearing 152 described herein.

In some examples, the motor assembly 140 may further include a rotor 164. The rotor 164, shown in FIG. 5, may have a hollow shaft or hollow rotor form. For example, the rotor 164 may include a rotor housing 165 that supports a series of rotor magnets 166. The rotor housing 165 may support the series of rotor magnets 166 such that the series of rotor magnets 166 are disposed circumferentially about a peripheral surface of the rotor housing 165. The series of rotor magnets 166 may have a common or consistent spacing along the periphery. The rotor 164 is further shown as including a rotor engagement feature 167 may include a series of threaded portions or other structure configured to fixedly couple the rotor 164 to shaft for common rotation. The rotor 164 further define a rotor passage therethrough.

In some examples, the motor assembly 140 may further include fastener 170. The fasteners 170 may include a collection of screws or bolts. The fasteners 170 may be sufficiently long enough to pass through the rotor engagement feature 167 and at least partially into the motor shaft 142.

In some examples, the motor assembly 140 may further include a stator 171. The stator 171 may be operably coupled with the rotor 164 such that upon introduction of an electric current, the stator 171 and rotor 164 may rotate relative to one another. To facilitate the foregoing, the rotor stator 171 may include windings 172 wound about and collectively define a stator passage 173. The stator passage 173 may be sized such that the rotor 164 may fit therein with the stator 171 encircling the rotor 164. The stator 171 may be a stationary component. The introduction of electric current to the windings 172 of the stator 171 may induce an electromagnetic field that encounters the rotor magnets 166 and causes the rotor 164 to correspondingly rotate.

In some examples, the motor assembly 140 may further include an aft motor housing 174. The aft motor housing 174 may be complementary housing portion with the forward motor housing 156. The after motor housing 174 and the forward motor housing 156 may cooperate to collectively enclose the rotational and other components of the motor assembly 140. In this regard, the aft motor housing 174 may include an aft motor housing cover 175. The aft motor housing cover 175 may define a volume or basket for receipt of the rotational components of the motor assembly 140. The aft motor housing cover 175 may be mateable with the forward motor housing cover 156 to define the enclosed or partially enclosed volume. The aft motor housing cover 175 may also define an aft motor housing passage 176 therethrough.

In some examples, the motor assembly 140 may further include a cap 178. The cap 178 may be configured for seating one or more shafts of the rotor assembly 120 as well as housing a biasing elements therein. In this regard, and with reference to FIGS. 5 and 8A, the cap 178 may include a cap wall 179 that defines a cap volume 180.

Figure 6:
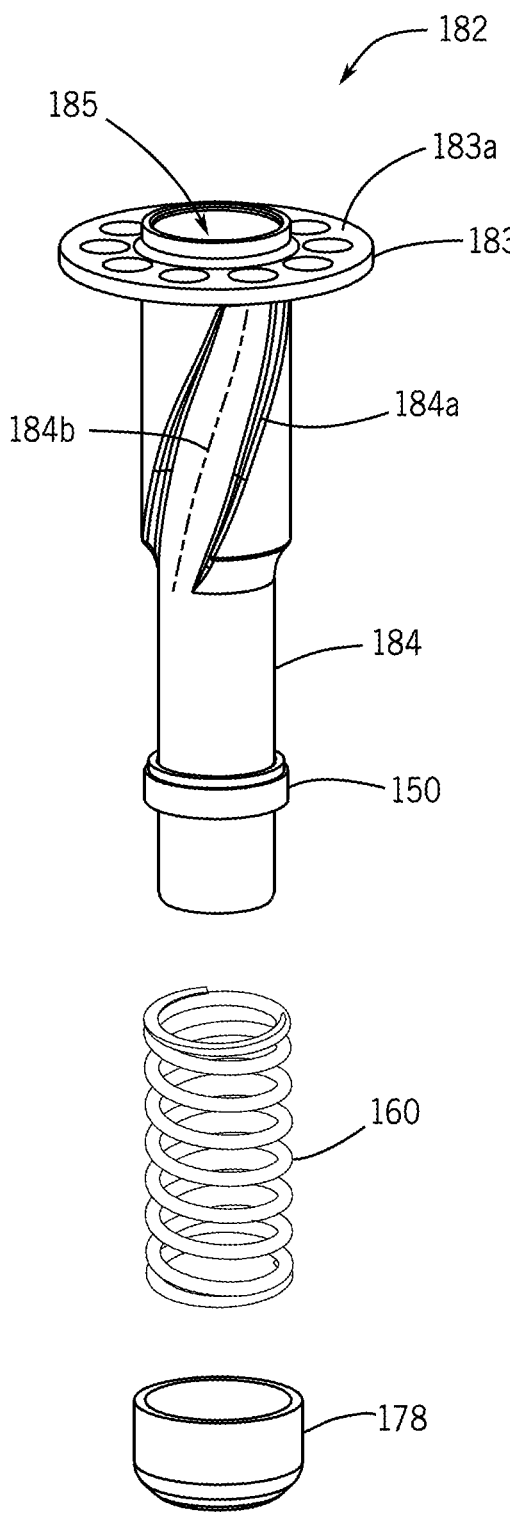
FIG. 6 depicts a blade shaft, a biasing element, and a cap of the rotor assembly of FIG. 2.

The motor assembly 140 may be operably coupled with the downstream blade 122 and the upstream blade 132. For example, as shown in FIGS. 5 and 6, the rotor assembly 120 may include a blade shaft 182 that facilitate the operable coupling of the motor assembly 140 with the downstream blade 122 and the upstream blade 132. The blade shaft 182 may include a blade shaft flange portion 183 and a blade shaft mast portion 184. The blade shaft flange portion 183 may be configured to facilitate co-molding or otherwise coupling of the blade shaft 182 to one or both of the downstream blade 122 and upstream blade 132. For example, the blade shaft flange portion 183 may extend radially out from a center of the blade shaft 182 and define a plurality of circumferentially spaced blade shaft engagement features 183a. The blade shaft engagement features 183a may be through holes adapted to permit entry of a co-molded material (e.g., a co-molded material used to form a blade) therethrough to support bonding. In other cases, the blade shaft engagement features 183a may be threaded features or the like.

The blade shaft mast portion 184 may be a cylindrical or tubular structure that extends from the blade shaft flange portion 183. The blade shaft flange portion 183 may define a grooved features 184a along an outer surface. The grooved feature 184a may be an indent or lowered portion of the outer surface. The grooved feature 184a may define a rotational path 184b, as shown in FIG. 6. The rotational path 184b may extend generally along a longitudinal direction of the blade shaft mast portion 184 while also advancing about the longitudinal direction in order to form a spiral-type pathway along the outer surface of the blade shaft mast portion 184. As described herein, the rotational path 184b may define a keyed pathway or keyed engagement between the downstream blade 122 and the upstream blade 132. Additionally, the blade shaft flange portion 183 and the blade shaft mast portion 184 may cooperate to define a central blade shaft passage 185 therethrough.

The downstream blade 122 and the upstream blade 132 may also include various structures and components to facilitate the operative coupling and other functionality described herein. For example, and as shown in FIGS. 7A-7C, the coupling portion 126 of the downstream blade 122 may include a receiving body 127. The receiving body 127 may have a sufficient thickness for co-molding with the blade shaft flange portion 183 described above. The receiving body 127 may define an aperture 128 through the coupling portion 126. Further, and with reference to the upstream blade 132, the coupling portion 136 may include or otherwise be defined by a mating flange 137. The mating flange 137 may define a structural connection for the blade portions of the upstream blade 132. The mating flange 137 may further include engagement features 137a. The engagement features 137a may be threaded through portions of the mating flange 137. The engagement features 137a may be configured to receive fastener 189 therethrough for coupling of the coupling portion 136 with, for example, the motor shaft 142, as shown in FIG. 7B. The coupling portion 136 may also include a rotational key feature 138. The rotational key feature 138 may be an inner flange or component inset within the mating flange 137. The rotational key feature 138 may define a keyed surface 138a along an inner surface. The keyed surface 138a may include one or more grooves configured for complementary engagement with, for example, the grooved feature 184a of the blade shaft 182. The rotational keyed feature 138 may also define an aperture 139 through the coupling portion 136.

The rotor assembly 120 may be coupled such that the downstream blade 122 and the upstream blade 132 are attached to the blade shaft 182. In the example of FIGS. 7A-7C, the downstream blade 122 is fixedly coupled with the blade shaft 182. In one implementation, and as shown in FIG. 7A, the blade shaft 182 and the downstream blade 122 may be co-molded components. In this regard, the downstream blade 122 may be manufactured, in part, by molding a portion of the downstream blade 122 over the a portion of the blade shaft 182. In particular, the coupling portion 126 of the downstream blade 122 may be formed by molding a molten material over the blade shaft flange portion 183. This operation may partially or completely engulf the blade shaft flange portion 183 within the receiving body 127 of the coupling portion 126. The molten material may solidify partially in the blade shaft engagement features 183a in order to establish a secure connection between the downstream blade 122 and the blade shaft 182. In other cases, the blade shaft 182 may be secured to the downstream blade 122 using fasteners.

The upstream blade 132 may be coupled with the blade shaft 182 and permitted a limited range of movement relative thereto. As shown in FIG. 7C, the blade shaft 182 may be advanced through the aperture 139 defined by the coupling portion 136 of the upstream blade 132. The blade shaft 182 may be advanced through the aperture 139 such that the keyed surface 138a of the coupling portion 136 engages the grooved feature 184a of the blade shaft 182. For example, the keyed surface 138a may sit in, and extend partially into, the recessed region of the outer surface of the blade shaft 182 that defines the groove feature 184a. Upon the engagement of the keyed surface 138a with the grooved feature 184a, the grooved feature 184a may define the rotational and axial movement of the upstream blade 132 relative to the blade shaft 182. For example, the grooved feature 184a may permit the keyed surface 138a to travel along the rotational path 184b, described above. In this regard, the position of the upstream blade 132 may similarly be defined by the rotational path 184b. For example, as keyed surface 138a is advanced along the rotational path 184b, the rotational path 184b follows a curve or spiral about the longitudinal axis. Accordingly, movement of the upstream blade 132 along the longitudinal axis will similarly cause a curve or rotation of the upstream blade 132 about the longitudinal axis. As explained in greater detail with respect to the operation of the rotor assembly 120 below, this engagement between the keyed surface 138b and the grooved feature 184a may support the non-orthogonal and axial-offset arrangement of the downstream blade 122 and the upstream blade 132 during rotation.

The downstream blade 122 and the upstream blade 132 may be coupled to the motor assembly 140 via the blade shaft 182. For example, and as shown in FIG. 7B, fasteners 189 can be used to secure the coupling portion 136 of the upstream blade 132 to the motor shaft 142. The fasteners 189 may extend through individual ones of the engagement features 137a of the coupling portion 136 and into respective ones of the series of engagement features 145. Coupling in this manner may fixedly secure the upstream blade 132 to the motor shaft 142 such that upon rotation of the motor shaft 142, the upstream blade 132 will correspondingly rotate.

The motor shaft 142 may be coupled in the motor assembly 140 to the rotor 164. For example, and with reference to FIGS. 5 and 8A, fastener 170 may be advanced through the rotor engagement feature 167 and inserted at least partially into the rotor coupling feature 148 of the motor shaft 142. In this regard, the motor shaft 142 may be fixedly connected to the rotor 164 such that when the rotor 164 is causes to rotate, the motor shaft 142 (and consequently the upstream blade 132) will rotate as well.

Figure 8A:
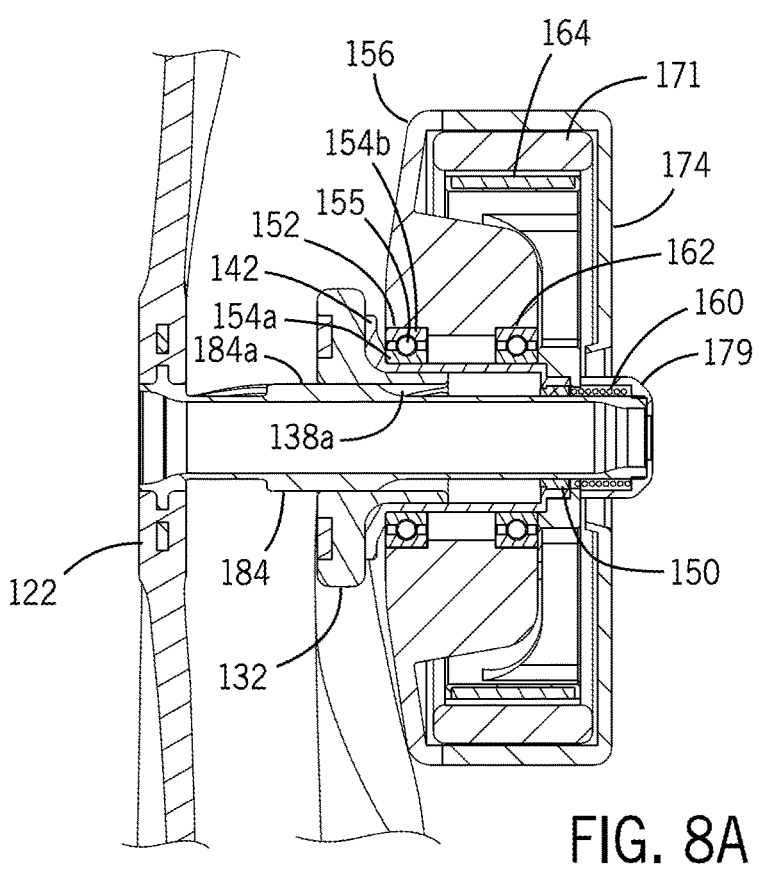
FIG. 8A depicts a cross-sectional view of the rotor assembly of FIG. 2, taken along line 8A-8A of FIG. 2.
Figure 8B:
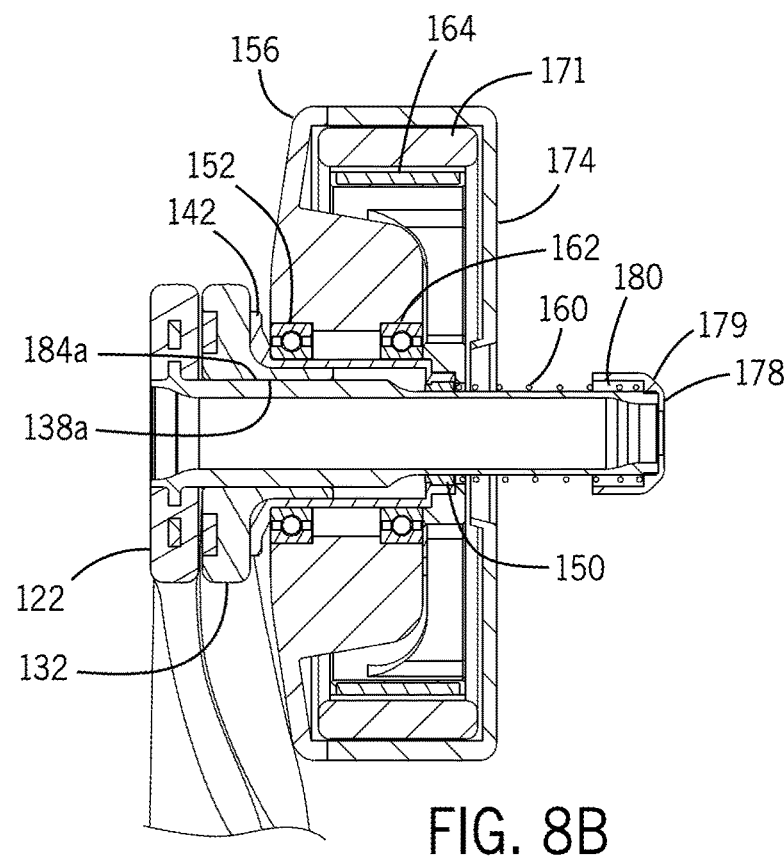
FIG. 8B depicts a cross-sectional view of the rotor assembly of FIG. 2, taken along line 8B-8B of FIG. 4.

The rotor 164 may be coupled in the motor assembly 140 by seating the rotor 164 within the stator 171. For example, the rotor 164 may be arranged substantially within the stator 171 such that the windings 172 surround the rotor magnets 166 of the rotor 164. The rotor 164 and the stator 171 may be arranged within the motor assembly 140 and substantially covered by the forward motor housing 156 and the aft motor housing 174, as shown in FIGS. 8A and 8B. The motor shaft 142 may extend from the rotor 164, from within the housing, and out of the forward housing through the forward motor housing aperture 159.

The downstream blade 122 may be coupled to the motor assembly 140 via the blade shaft 182. For example, the blade shaft 182 is fixedly connected to the downstream blade 122 and extend through the aperture 139 of the upstream blade 132, as described above. The blade shaft 182, with reference to FIG. 8A, may further extend through the motor shaft axial passage 147 of the motor shaft 142, the bushing passage 151 of the support bushing 150, the biasing element 160, the rotor passage 167 of the rotor 164, the aft motor housing portion 176 of the aft motor housing 174, and into the cap 178. The support bushing 150 may be arranged to center the blade shaft 182 within the axial passage 147 of the motor shaft 142. In some cases, the motor shaft 142 may define a seat or ledge upon which the support bushing is engaged in order to limit axial travel of the support bushing toward the downstream blade 122. The first end 160a of the biasing element 160 may be seated against the support bushing 150 opposite the ledge or other feature of the motor shaft 142. The second end 160b of the biasing element 160 may extend into the cap volume 180 of the cap 178 with the terminal end of the blade shaft 182. The terminal end of the blade shaft 182 may connected to the cap 178 within the cap volume 180. The biasing element 160 may be arranged such that that second end 160a is configured to encourage the cap 178 (and connected blade shaft 182) away from the support bushing 150, as shown in FIG. 8B.

The motor assembly 140 is further coupled such that motor shaft 142 is rotatably coupled with, and positioned relative to, the forward motor housing 156. For example, and as shown in FIGS. 8A and 8B, the blade shaft 182 may extend through the upper bearing passage 153 of the upper bearing 152. The blade shaft 182 may further extend through the lower bearing passage 163 of the lower bearing 162. The upper bearing 152 and the lower bearing 162 may be positioned in the forward motor housing aperture 159. The respective outer races of the bearings 152, 162 may be fixed to the forward motor housing 156, while the respective inner races are permitted to rotates relative to the forward motor housing 156 along with the rotation of the motor shaft 142.

In operation, the motor assembly 140 may cause a rotation of the motor shaft 142, which in turn causes a rotation of the downstream blade 122 and the upstream blade 132. As an example, a current or electrical charge may be introduced to the stator 171. In response to the current, the stator winding 172 may produce an electromagnetic field that interacts with the rotor magnets 166. The electromagnetic field may cause the rotor magnets 166 to traverse the field in a manner that causes a rotation of the rotor 164. The rotation of the rotor 164 may cause a corresponding rotation of the motor shaft 142, which is fixedly coupled to the rotor 164. The rotation of the motor shaft 142 may cause a rotation of the upstream blade 132, which is fixed to the motor shaft 142. In turn, the rotation of the upstream blade 132 may cause the rotation of the blade shaft 182. Finally, the rotation of the blade shaft 182 may cause a rotation of the downstream blade 122, which is fixed to the blade shaft 182.

The motor assembly 140 may further operate to cause the rotor assembly 120 to transition from the compact configuration of the blades (as shown in FIGS. 4 and 8B) to a deployed configuration of the blades (as shown in FIGS. 2, 3, and 8A). For example, in a passive or non-actuated (e.g., non-rotated) state, the blades may be biased toward the compact configuration. As shown in FIG. 8B, the biasing element 160 may exert a biasing force that causes the cap 178 to be biased away from the aft motor housing 174. The terminal end of the blade shaft 182 is fixed to the cap 178. Accordingly, the bias of the cap 178 and the terminal end of the blade shaft 182 away from the aft motor housing 174 may cause blade shaft 182 to advance deeper into motor assembly 140. The blade shaft 182 may advance sufficiently deep into the motor assembly 140 such that the downstream blade 122 is stacked or positioned adjacent the upstream blade 132, as shown in FIG. 8B. In the stacked position the axial offset of the blades 122, 132 is reduced or eliminated.

With reference to FIGS. 4 and 8B, when blade shaft mast portion 184 is sufficiently deep into the motor assembly 140, the downstream blade 122 may be arranged substantially within a footprint of the upstream blade 132. For example, when the downstream blade 122 and the upstream blade 132 are stacked relative to one another, the downstream blade orientation 121 may be generally parallel with the upstream blade direction orientation 131. In some cases, the downstream blade direction orientation 121 and the upstream blade orientation 131 may be parallel to one another due in part to the keyed engagement of the keyed surface 138a of the upstream blade with the grooved feature 184a of the blade shaft 182. For example, as the blade shaft 182 is advanced into the motor assembly 140, along the axis of rotation 101, the blade shaft 182 may turn as a function of the rotational path 184b of the grooved feature 184a. The rotational path 184b may be so defined such that that the rotational path 184b terminates adjacent the downstream blade 122 at a position relative to the downstream blade 122 in which the downstream blade 122 is general parallel with, and otherwise within a footprint of, the upstream blade 132. In this regard, upon cessation of rotation, the motor assembly 140 operates to align the downstream blade 122 with the upstream blade 132. The biasing element 160 may causes the blade shaft 182 to advance deeper into the motor assembly 140, thereby causing the downstream blade 122 to rotate and stop at a position generally parallel with the upstream blade 132.

The motor assembly 140 further operates to transition the rotor assembly 120 from the compact configuration, in which the blades at stacked, to the deployed configuration, in which the blades are arranged axially offset from one another and at a generally non-orthogonal orientation. For example, the motor assembly 140 may rotate the motor shaft 142, as described above, which in turn causes the rotation of the upstream blade 132 and associated coupling portion 136. The rotation of the coupling portion 136 causes to the keyed surface 138a to rotate correspondingly. The keyed surface 138a may advance along a common plane transverse to the rotational axis 101, and as such, impact the grooved feature 184a of the blade shaft 182. The rotation of the keyed surface 138a in this manner may cause a rotation of the blade shaft 182. Rotation of the keyed surface 138a in this manner may also causes the blade shaft 182 to travel out of the motor assembly 140, due in part to the inertial forces causes by the rotation. For example, the rotation of the blade shaft 182 may induce an inertial force that overcomes the biasing force provided by the biasing element 160 and encourages the blade shaft 182 to move out of the motor assembly 140, toward the position shown in FIG. 8A. As the blade shaft 182 is encourage to travel out of the motor assembly 140 (e.g., along the rotational axis 101), the rotational position of the downstream blade 122 is defined by the keyed engagement of the keyed surface 138a and the grooved feature 184a. In this regard, the rotational path 184b may define a relative position of the downstream blade 122 and upstream blade 132 during rotation. The rotational path 184b may be so defined such that that the rotational path 184b terminates at a position relative to the downstream blade 122m in which the downstream blade 122 is arranged to define the deployed configuration shown herein. For example, the rotational path 184b may allow the blade shaft 182 to move away from the motor assembly until the downstream blade 122 defines the axial offset 105 and the angular spacing a with the upstream blade 132. The position at which the rotational path 184b terminates may define a stop position for the downstream blade 122 during rotation, for example, a position at which the downstream blade 122 is generally prevented from further axial offset or angular spacing with the upstream blade 132. The continuation rotation of the downstream blade 122 and the upstream blade 132 may encourage the downstream blade to remain at the stop position during operation, and thereby maintain the axial offset 105 and the angular spacing a during rotation.

Other configurations are contemplated herein, which may also facilitate noise reduction, including configuration that also define a non-orthogonal and/or axial offset of the blade 122, 132. To illustrate, and with reference to FIG. 9, a rotor assembly 900 is shown. The rotor assembly 900 may be operationally analogous to the rotor assembly 120 described above in relation to FIGS. 1-5, and may be used to support a hovering operation of the unmanned aerial vehicle 100. The rotor assembly 900 is shown as including a boom 902 and motor assembly 904. The boom 902 may extend from an unmanned aerial vehicle and position the motor assembly 904 away from a fixed wing or fuselage of the UAV. The motor assembly 904 may include a first motor subassembly 906a and a second motor subassembly 906b. The first motor subassembly 906a may be configured to cause a rotation of a top blade 908a. The second motor subassembly 906b may be configured to cause a rotation of a bottom blade 908b.

Figure 9:
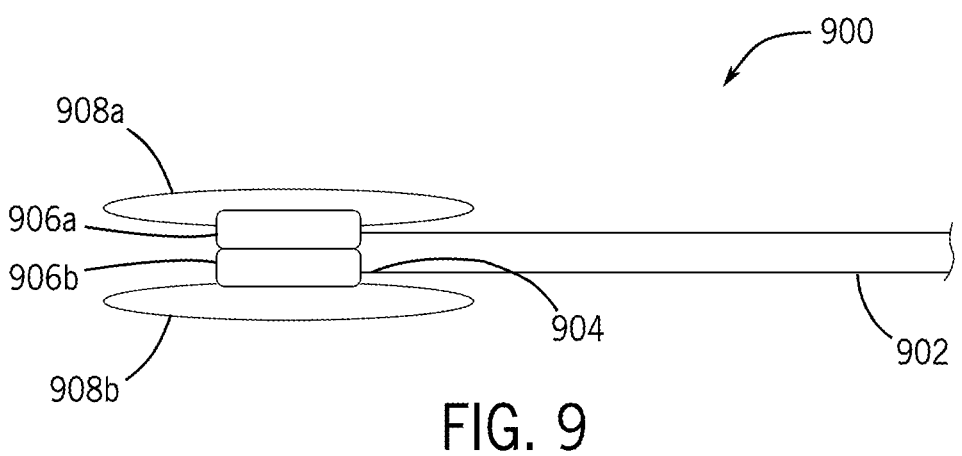
FIG. 9 depicts another example rotor assembly of the present disclosure.

The rotor assembly 900 may operate by substantially maintaining the top blade 908a and the bottom blade 908b in an axially spaced and non-orthogonal orientation during rotational operations, thereby reducing noise. For example, the physical arrangement of the first motor subassembly 906a and the second motor subassembly 906b may axially space the top blade 908a from the bottom blade 908b, as shown in FIG. 9. Further, absolute position sensing may be used in order to maintain the top blade 908a at an orientation generally non-orthogonal to the bottom blade 908b. For example, the position of the top blade 908a and the bottom blade 908b can in turn be controlled so that the top blade 908a and the bottom blade 908b have a generally non-orthogonal orientation during rotation. Further, upon cessation of hovering operations, the first motor subassembly 906a and the second motor subassembly 906b may stop the top and bottom blades 908a, 908b at a position in which the blades are generally aligned or parallel with one another in order, for example, to reduce drag during forward flight.

Figure 10:
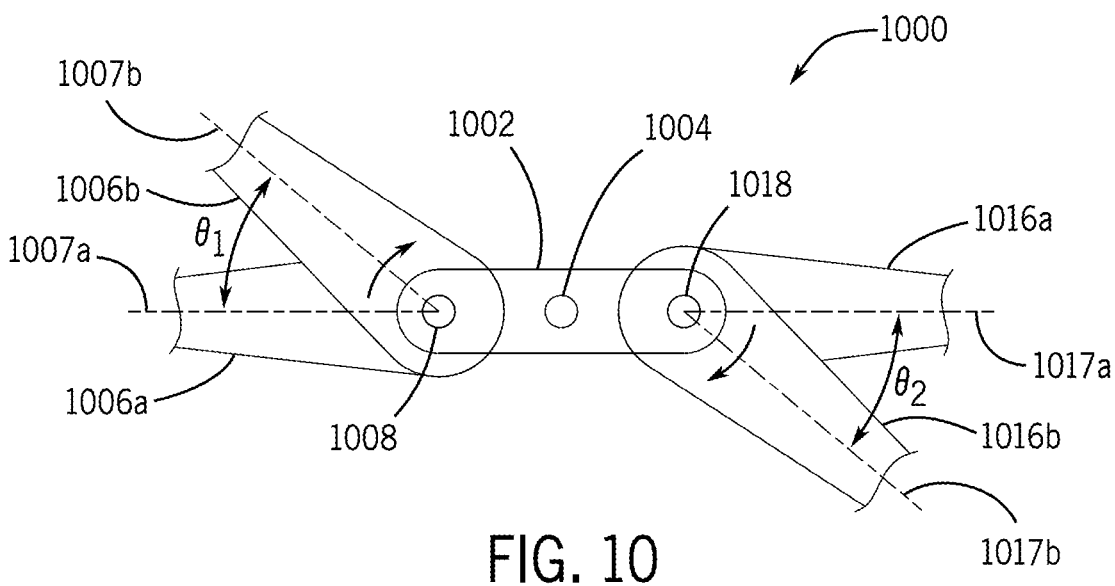
FIG. 10 depicts another example rotor assembly of the present disclosure.

In other arrangements, a lead-lag hinge may be employed to facilitate maintaining the blades at a generally non-orthogonal orientation during rotation. For example, and as shown in FIG. 10, a rotor assembly 1000 is provided. The rotor assembly 1000 includes a central rotational member 1002 configured to rotate about an axis 1004. The central rotational member 1002 may have a first end coupling 1008 coupled with a pair of downstream blades 1006a, 1006b. The pair of downstream blades 1006a, 1006b have respective blade orientations 1007a, 1007b. The central rotational member 1002 may have a second end coupling 1018 coupled with a pair of upstream blades 1016a, 1016b. The pair of upstream blades 1016a, 1016b have respective blade orientations 1017a, 1017b. The first end coupling 1008 and the second end coupling 1018 may function as a lead-lag-type coupling in order to encourage the blades to angularly space from one another upon rotation, and thereby define a non-orthogonal arrangement. For example, upon rotation of the central rotational member 1002 about the axis 1004, the first end coupling 1008 may encourage the pair of downstream blades 1006a, 1006b to separate by an angular spacing $\theta_1$. Further, upon rotation of the central rotational member 1002 about the axis 1004, the second end coupling 1018 may encourage the pair of upstream blades 1016a, 1016b to separate by an angular spacing $\theta_2$. The angular spacings $\theta_1$, $\theta_2$ may be configured to reduce noise.

Figure 11:
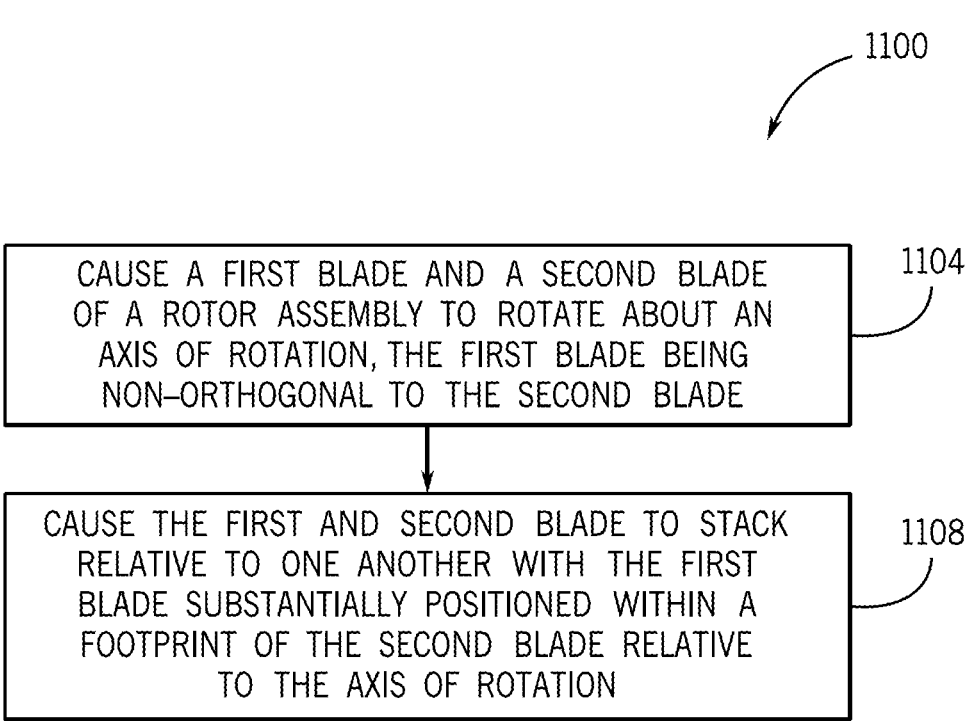
FIG. 11 depicts a flow diagram of operating a rotor assembly of the present disclosure.

To facilitate the reader's understanding of the various functionalities of the examples discussed herein, reference is now made to the flow diagram in FIG. 11, which illustrates process 1100. While specific steps (and orders of steps) of the methods presented herein have been illustrated and will be discussed, other methods (including more, fewer, or different steps than those illustrated) consistent with the teachings presented herein are also envisioned and encompassed with the present disclosure.

At operation 1104, a downstream blade and a upstream blade of a rotor assembly of a rotor assembly are causes to rotate about an axis of rotation. The downstream blade non-orthogonal to and axially offset from the upstream blade during the rotation. For example, and with reference to FIGS. 2 and 8A, operation of the motor assembly 140 may cause the downstream blade 122 and the upstream blade 132 to rotation about the axis of rotation 101. The motor assembly 140 may maintain the downstream blade 122 and the upstream blade 132 in the deployed configuration of FIG. 2 during rotation, as described herein. For example, the motor assembly 140 may rotate the blade shaft 182 and induce inertial forces that cause the blade shaft 182 to partially exit the motor assembly 140 and rotatable advance into the non-orthogonal arrangement using the rotational path 184b. Accordingly, the motor assembly 140 may maintain the downstream blade 122 and the upstream blade 132 at the axial offset 105 and the angular spacing $\alpha$ during the rotation of the rotor assembly 120.

At operation 1108, the downstream blade and the upstream blade are causes to stack relative to one another. The downstream blade is substantially within a footprint of the upstream blade relative to the axis of rotation. For example, and with reference to FIGS. 4 and 8B, ceasing operation of the motor assembly 140 may cause the downstream blade 122 to transition to a stacked and generally aligned configuration with the upstream blade 132, as described herein. For example, upon cessation of rotation, the inertial forces may corresponding cease. As such, the bias from the biasing element 160 may encourage the blade shaft 182 to retract back into the motor assembly 140, as shown in FIG. 8B. The blade shaft 182 may retract into the motor assembly 140 and rotate according to the keyed pathway relationship as defined between the grooved feature 184a of the blade shaft 182 and the keyed surface 138a. Accordingly, the motor assembly 140 may maintain the downstream blade 122 and the upstream blade 132 at an orientation in which the angular spacing the axial offset is substantially reduced or eliminated during period of non-use or non-rotation.

With reference to FIGS. 12-15B, additional embodiments of a rotor assembly are disclosed. In various embodiments, such as those shown in FIGS. 12-15B, the rotor assembly may facilitate noise reduction and/or a reduced amount of drag force on the rotor assembly. For example, an asymmetric rotor assembly 2119 may include an asymmetric rotor 2120 and a teeter assembly 2180. The asymmetric rotor assembly 2119 may utilize one or more of the components previously discussed. For example, the asymmetric rotor assembly 2119 may couple to the previously discussed motor assembly 140 and may be configured to be coupled to an aerial vehicle 100, either as the primary or auxiliary lift generator (e.g., can be used along with a fixed wing or propeller configuration).

The asymmetric rotor assembly 2119 may generate lift to allow an aerial vehicle, such as the unmanned aerial vehicle 100, to hover by rotating the asymmetric rotor 2120 about the axis of rotation 2101. The asymmetric rotor 2120 may include two or more blades 2121 and a mass portion 2140 extending from a hub 2160.

The asymmetric rotor 2120 may include a first blade, which may be an upstream blade 2132, and a second blade, which may be a downstream blade 2122. In additional arrangements, a single blade or more than two blades may be included. In examples with more than two blades, the upstream blade 2132 and the downstream blade 2122 may define the outermost blades. As shown in FIG. 12-15B, the upstream blade 2132 may have an upstream orientation 2131 and the downstream blade 2122 may have a downstream orientation 2127. The upstream orientation 2131 and downstream orientation 2127 may extend relatively straight relative from the axis of rotation 2101 or the orientations may change direction relative to the axis of rotation 2101 as they extend outward.

Figure 12:
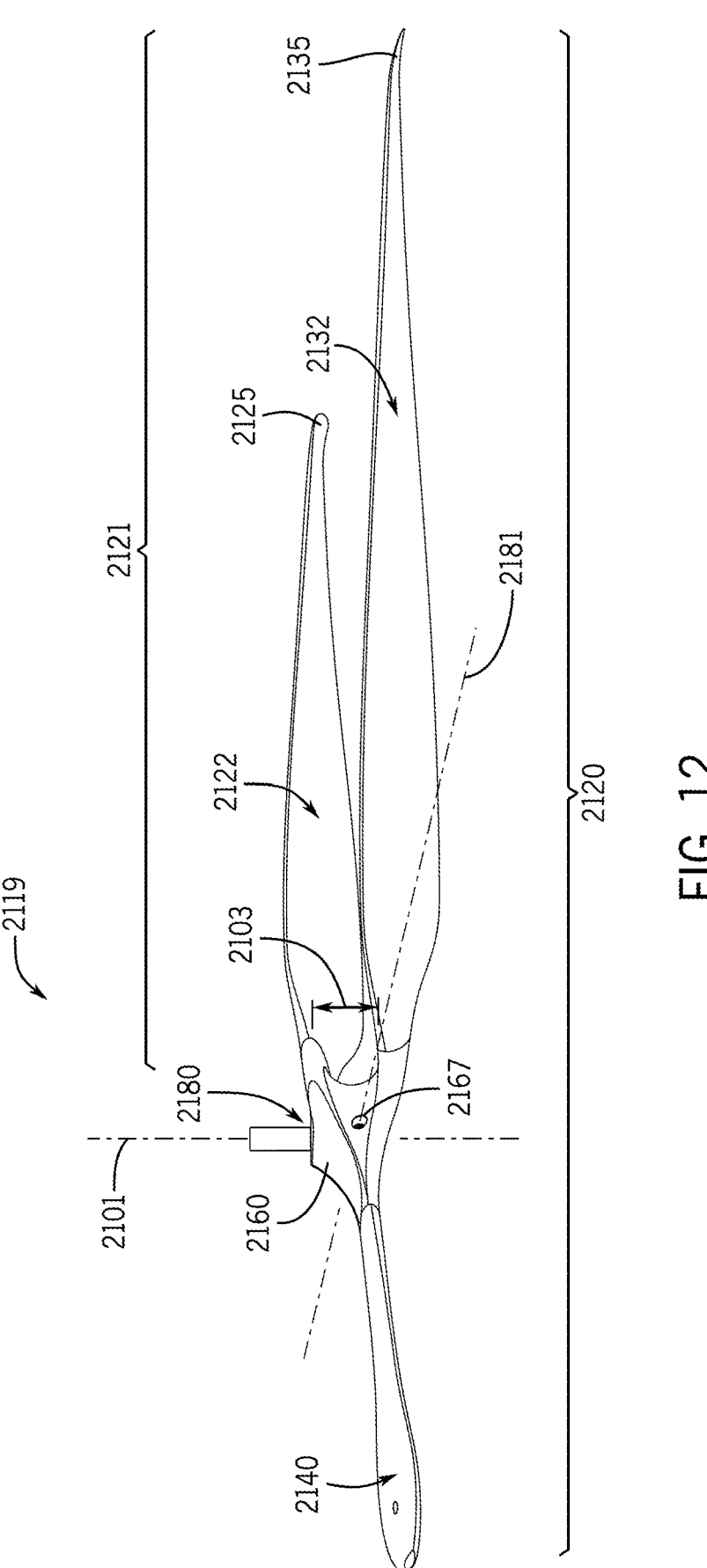
FIG. 12 depicts a front-right perspective view of an example asymmetric rotor assembly.
Figure 13:
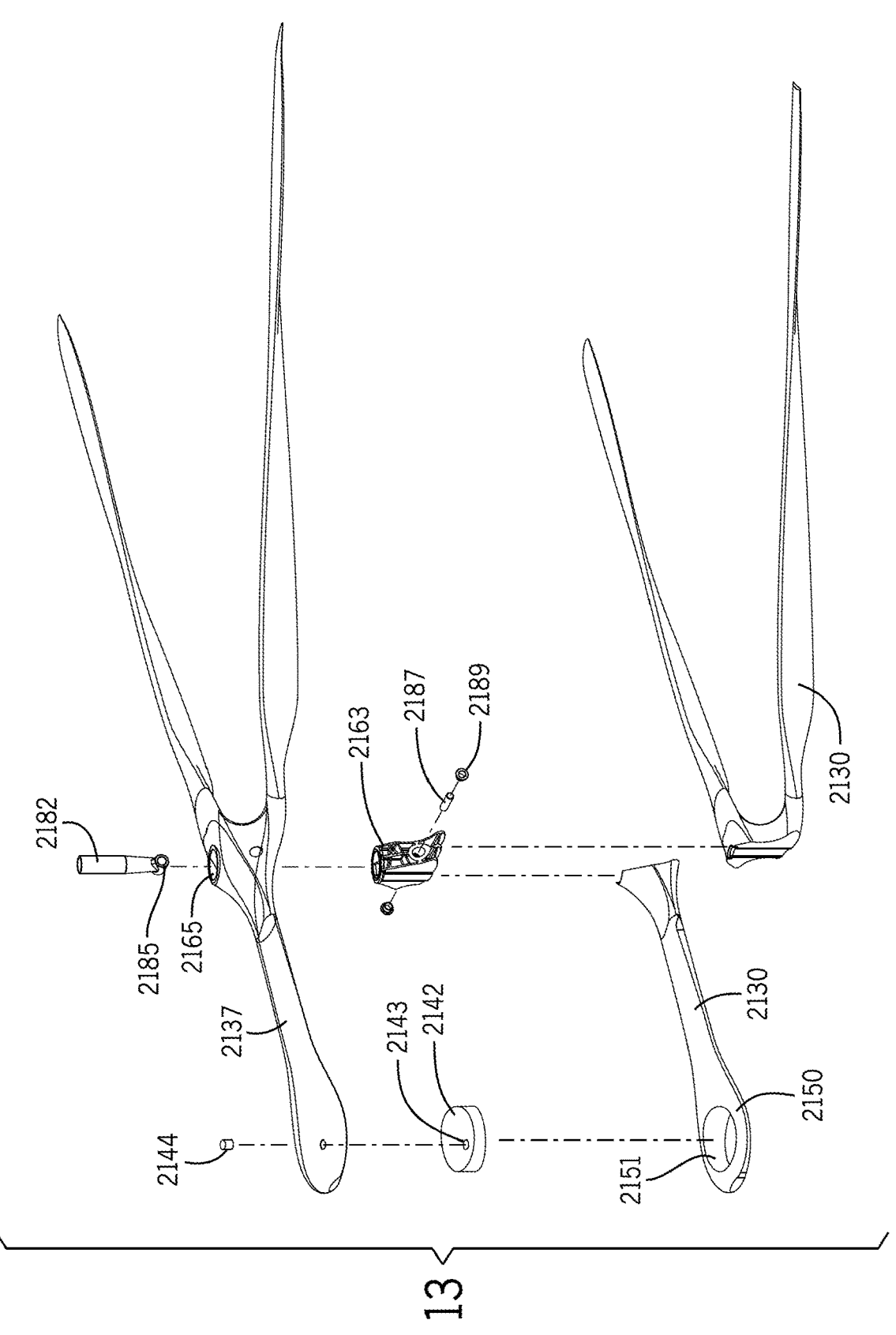
FIG. 13 depicts an exploded view of an example asymmetric rotor assembly.

The upstream blade 2132 may include a blade body 2133 including a leading edge 2134a, a trailing edge 2134b, and a tip 2135. The leading edge 2134a may be configured to be oriented facing the direction of rotation of the upstream blade 2132, the trailing edge 2134b may be configured to be oriented away from direction of rotation. The change in position of the leading edge 2134a to the position of the trailing edge 2134b relative to the axis of rotation 2101 may define a pitch. The tip 2135 may define the terminal end of the blade 2132. In some examples, the tip 2135 may be oriented along a different plane or direction relative to the upstream blade orientation 2131. For example, as shown in FIG. 12, the surface of the upstream blade 2132 may extend downward to the tip 2135 such that the tip 2135 is positioned below the blade body 2133.

The upstream blade 2132 may generally be an aerodynamic foil or have a foil cross-section such that transversal of the upstream blade 2132 through air may generate lift. For example, the blade body 2133 may extend from the leading edge 2134a at a first slope until reaching a first location and sloping at a lesser degree to the trailing edge 2134b. Further, the upstream blade 2132 may twist along its length, defining a varying pitch. For example, a cross section at one location of the upstream blade 2132 along the upstream orientation 2131 may have a pitch in one orientation with respect to the axis of rotation 2101 and a cross section taken at a second location along the upstream orientation 2131 may have a pitch in a second orientation.

The downstream blade 2122 may be a substantially analogous structure to the upstream blade 2132 and include substantially similar features. For example, the downstream blade 2122 may include a blade body 2123, a leading edge 2124a, a trailing edge 2124b, and a tip 2125 configured in a similar manner as described above with respect to the upstream blade 2132. The downstream blade 2122 may also be an airfoil. The downstream blade 2122 may also have a pitch, or a varying pitch, configured to generate lift. In other examples, the upstream blade 2132 and downstream blade 2122 may have a different length, width, or shape, etc. In some examples, upstream blade 2132 and downstream blade 2122 may have the same length, width, or shape but one blade may be extend from the hub 2160 at a different initial orientation. For example, the pitch of one blade at a distance from the axis of rotation 2101 may be different from the pitch of the other blade at the same distance from the axis of rotation 2101.

Figure 15A:
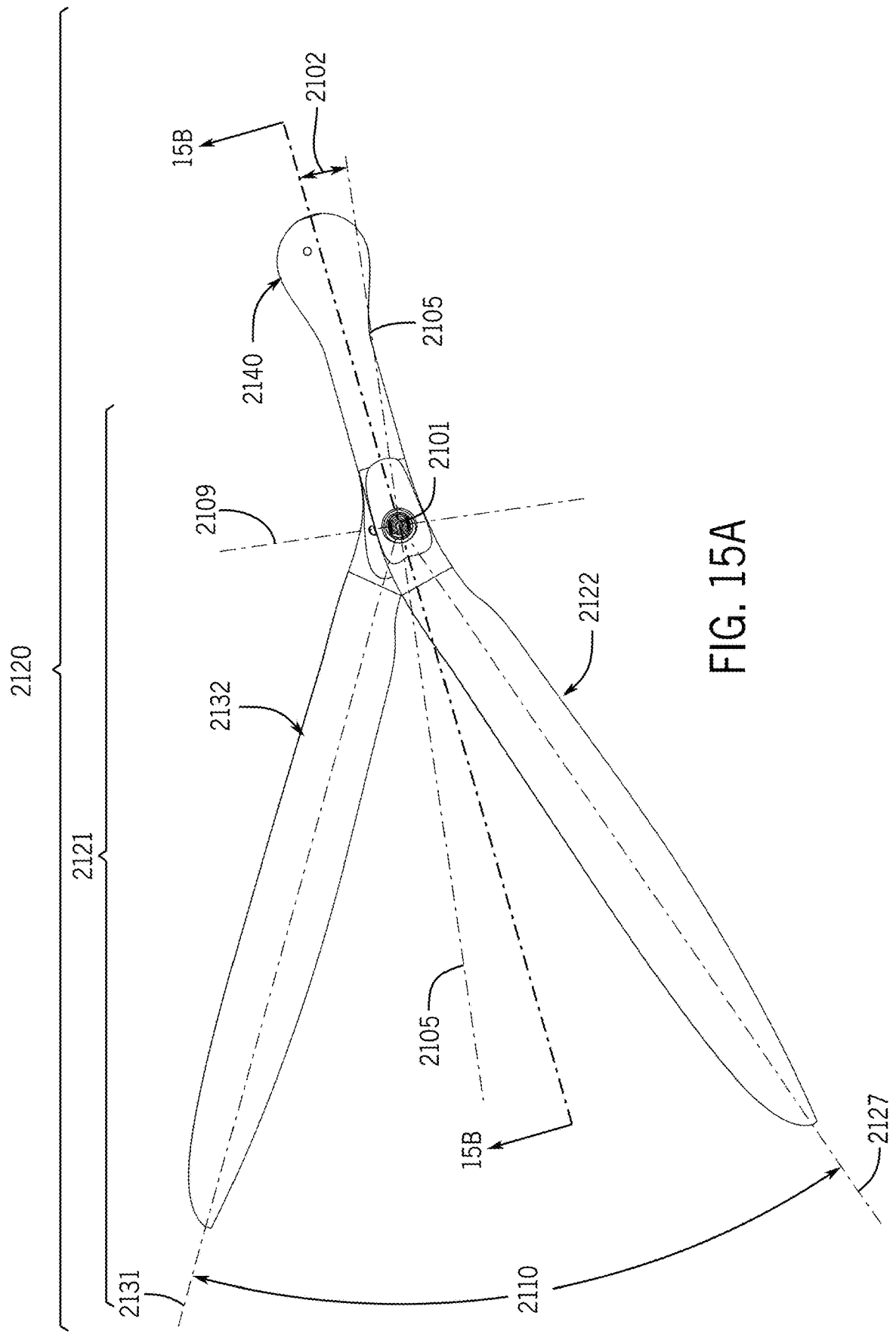
FIG. 15A depicts a top plan view of an example asymmetric rotor assembly.

With reference to FIG. 15A, the upstream blade 2132 and downstream blade 2122 may define an angularly spacing 2110 about the axis of rotation 2101 such that the upstream blade orientation 2131 may extend towards the direction of rotation relative to the downstream orientation 2127. The angular spacing 2110 may be non-orthogonal in relation to the axis of rotation 2101, e.g., the blades 2121 may not be oriented at 90 degrees relative to each other. In various embodiments, the blades 2121 may define an acute angle for the angular spacing 2110 such that both the upstream blade 2132 and downstream blade 2122 may extend towards a single side or half relative to the axis of rotation 2101, such as in a "scissor-type" configuration. For example, the angular spacing 2110 of the upstream blade 2132 and the downstream blade 2122 may have a midpoint, or half-angle, located at an equal spacing between the upstream blade 2132 and downstream blade 2122. A longitudinal axis 2105 may be defined as an axis extending through the midpoint and the axis of rotation 2101. A bisecting line 2109 may be defined by an axis intersecting the axis of rotation 2101 at an angle perpendicular to the longitudinal axis 2105 in one plane and orthogonal to the longitudinal axis 2105 in a second plane. The bisecting line 2109 may then define two halves or sides relative to the axis of rotation 2101, with the both the upstream blade 2132 and the downstream blade 2121 in one of the two halves or sides. The upstream blade 2132 and downstream blade 2122 may further maintain a similar angular spacing 2110 over their lengths or the angular spacing 2110 may be greater or less at one point on their lengths compared to another point along their lengths.

In one embodiment, the two blades 2121 may be positioned within (i.e. closer than) 180 degrees of each other. In such an example, the upstream blade 2132 and the downstream blade 2122 may define the outer most blades. The upstream blade 2132 and the downstream blade 2122 may be separated by less than 180 degrees relative to the axis of rotation 2101. In embodiments where the rotor 2120 may include more than two blades 2121, all of the blades 2121 may be positioned to be within 180 degrees from the outer most blades. For example, all of the blades 2121 may be positioned between the upstream blade 2132 and the downstream blade 2122.

With reference again to FIG. 12, the upstream blade 2132 of the asymmetric rotor assembly 2120 may be axially spaced from the downstream blade 2122 relative to the axis of rotation 2101. The axial spacing may define an axial offset 2103. The axial offset 2103 may be defined by the blades 2121 extending from the hub at two different positions or by extending from the same location on the hub to two different axial positions. As shown in FIG. 12, the upstream blade 2132 may be positioned axially below the downstream blade 2122. The exact spacing and arrangement of the blades 2121 may vary depending on the size of the blades 2121 or the intended rotational speeds of the blades 2121 during use.

The asymmetric rotor 2120 may further include a mass portion 2140. The mass portion 2140 may extend from the hub 2160 outwards from the axis of rotation 2101 and may generally extend in a direction away from the upstream blade 2132 and the downstream blade 2122. The mass portion 2140 functions as a counterbalancing feature configured to balance the forces of the blades 2121 relative to the rotational axis 2101. For example, the mass portion 2140 may have a greater or denser mass than one of or both of the blades 2121, e.g., be configured to offset or balance the weight of one or both blades 2121. Further, the mass portion 2140 may have a length less than that of the blades 2121 such that during operation a moment generated by the greater weight at a shorter length may counter the moment generated by the lighter blades 2121 at a greater length relative to the axis of rotation 2101. The mass portion 2140, as shown in FIG. 15A, may be seated in the angular spacing 2110 between the blades 2121 on a side opposite the axis of rotation 2101 from the blades 2121.

For example, in a separate half, defined by the bisecting line 2109, from the blades 2121. The position and weight of the mass portion 2140 may each assist in balancing the blades 2121 relative to the axis of rotation 2101. By utilizing a mass portion 2140, rather than an additional blade, the asymmetric rotor 2120 may have a smaller surface area and therefore experience less drag forces.

Figure 14:
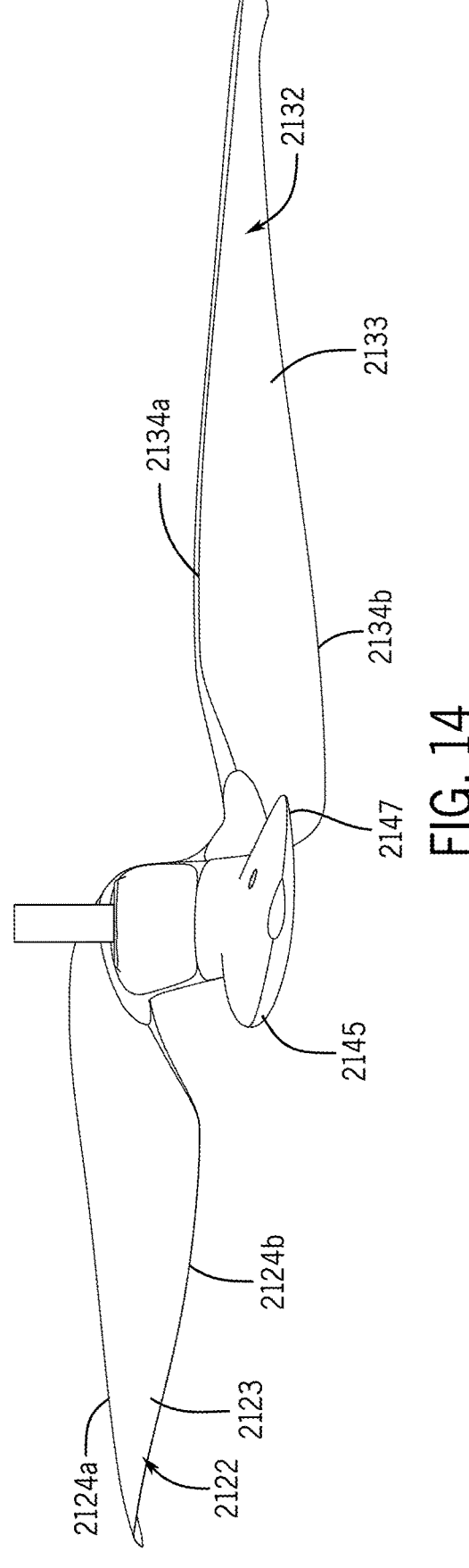
FIG. 14 depicts a front elevation view of an example asymmetric rotor assembly.

The mass portion 2140 may be a unitary element or may further include additional weighting elements, such as a mass insert 2142. The weighting elements may allow for varying configurations of the mass portion to account for manufacturing tolerances, dimensional, and/or material changes between asymmetric rotors 2120 or variations in operational requirements. The mass portion 2140 may have a leading side 2145, a trailing side 2147, and an end portion 2150. The leading side 2145 may be the side of the mass portion 2140 oriented in the direction of rotation, while the trailing side 2147 may be the side opposite of the leading side 2145. The mass portion 2140 may be have a greater thickness on one side as compared to the other side. For example, a cross section of the mass portion 2140 relative to the axis of rotation 2101 may have a thicker leading side 2145 and a thinner trialing side 2147. A greater thickness on the leading side 2145 may create a shape that reduces drag forces on the mass portion 2140 during rotation. In one example, as shown in FIG. 14, the shape of the mass portion 2140 may be that of a symmetrical airfoil with a rounded leading side 2145 tapering to a thinner trailing side 2147. The leading side 2145 may be higher relative to the axis of rotation 2101 than the trailing side 2147 such that the mass portion 2140 has a pitch. In one example, as best shown in FIG. 14, the mass portion 2140 may have a positive pitch relative to the axis of rotation 2101 to generate lift. In other examples, the mass portion 2140 may have little to no pitch relative to the axis of rotation 2101 to generate less or no lift.

The end portion 2150 may define a section of the mass portion 2140 with a greater amount of weight. For example, the end portion 2150 may receive the mass insert 2142. In other examples, the end portion 2150 may have more mass due to a greater width or thickness compared to the rest of the mass portion 2140. The end portion 2150 may be located towards the terminal end of the mass portion 2140, which may position the center of gravity 2202 of the mass portion 2140 the furthest from the axis of rotation 2101. Locating the center of gravity 2202 further from the axis of rotation 2101 may allow for better balancing. The end portion 2150 may further be rounded. For example, the leading side 2145 and trailing side 2147 may define the symmetrical airfoil over the length of the mass portion 2140 defining the end portion. Further, the leading side 2145 may be spaced from the trailing side 2147 at a greater distance over the end portion 2150, defining an end portion 2150 with a rounded shape. In one example, the end portion 2150 may receive the mass insert 2142. The end portion 2150 may define an aperture or pocket 2151 configured to receive the mass insert 2142. In one example, the end portion 2150 defines a pocket 2151 having a relatively circular shape. The end portion 2150 and pocket 2151 may generally be located towards the terminal end of the mass portion 2140. Additional pockets 2151 and additional mass inserts 2142 can be added or placed at different lengths from the axis of rotation 2101 as needed to balance the blades 2121.

The mass insert 2142 may move the center of gravity 2202 of the mass portion 2140 further from the axis of rotation 2101. For example, the mass insert 2142 may be a structure made from a material having a greater density or mass compared to the rest of the mass portion 2140 or the blades 2121. In one example, the mass insert 2142 may be a material different from the mass portion 2140 or blades 2121, such as being entirely or partially made from tungsten. In some examples, the mass insert 2142 may be integrally formed with the mass portion 2140. The mass insert 2142 may have a shape to nest with the pocket 2151, such as a circular shape to a match a circular aperture. The mass insert 2142 may further have a shape configured to align with the shape of the mass portion 2140. For example, as shown in FIG. 13B, the mass insert 2142 may be thicker on a side configured to be located towards the leading side 2145 and thinner on a side configured to be located toward the trailing side 2147 of the mass portion 2140. The mass insert 2142 may be tuned to adjust the location of the center of gravity 2202. Tuning may allow for better balancing of the asymmetric rotor 2120, such as for a given configuration of blades 2121 or rotational speeds. In one example, the mass insert 2142 may be tuned by removing or adding material to the mass insert 2142. For example, as shown in FIG. 13B, the mass insert 2142 may define a drill aperture 2143 located towards an edge of the mass insert 2142. A lighter material, such as a resin 2144, may be placed in the drill aperture 2143 to further tune the mass insert 2142 or to seal the drill aperture 2143.

Figure 15B:
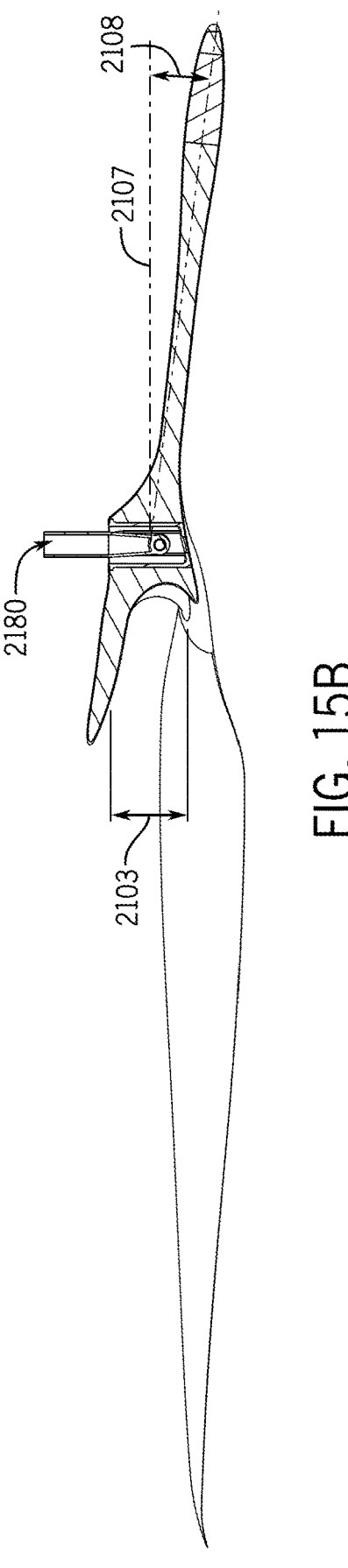
FIG. 15B depicts a cross-sectional view of an example asymmetric rotor assembly taken along line 15B-15B of FIG. 15A.

The mass portion 2140 or stub may extend from the hub 2160 axially or angularly offset from a symmetrical or orthogonal orientation, respectively defining a droop 2108 or a lag 2102. A droop 2108 may be defined when the mass portion 2140 extends from the hub 2160 downwardly and non-orthogonally relative in the axial direction relative to the axis of rotation 2101. For example, as best shown in FIGS. 15B and 17B, a latitudinal axis 2107 may be defined extending orthogonally from a point halfway between the axial spacing 2103. The latitudinal axis may be orthogonal to the axis of rotation 2101. The mass portion 2140 may extend from the hub 2160 in a direction or at a spacing offset from the latitudinal axis 2107. The droop 2108 may be the angular offset between the orientation of the mass portion 2140 and the orientation of the latitudinal axis 2107. The droop 2108 may act to counter forces and moments such as aerodynamic forces (e.g. lift or drag) or gravitational forces (e.g. weight) on the blades 2121, generating a moment relative the axis of rotation 2101, or assist in balancing the forces and moment relative to the axis of rotation 2101.

In regards to the lag 2102, the mass portion 2140 may extend from the hub 2160 at an angular offset 2102 from the longitudinal axis 2105, where the angular offset defines the lag 2102. In one example, as best shown in FIGS. 15B and 17A, the lag 2102 may be opposite the direction of rotation, such that the mass portion 2140 may be closer about the axis of rotation 2101 to the upstream blade 2132 as compared to the downstream blade 2122. The lag 2102 orientation of the mass portion 2140 may act to counter or balance the drag forces on the blade portions relative to the axis of rotation 2101.

The hub 2160 may be the central portion of the asymmetric rotor 2120 from which the mass portion 2140, upstream blade 2132, and downstream blade 2122 extend. The hub 2160 may include an integrally formed or separately coupled mount body 2163 within the hub 2160. The mount body 2163 may be an internal or integral frame of the hub 2160 configured to couple the mass portion 2140, upstream blade 2132, and downstream blade 2122 to the hub 2160, or, couple the hub 2160 to a feature connecting the asymmetric rotor assembly 2119 to the motor assembly 140. The mass portion 2140 may couple or extend from the hub 2160 at a relatively central location on the hub 2160 relative to the axis of rotation 2101. Each of the upstream blade 2132 and downstream blade 2122 may extend from an opposite side of the hub 2160 as the mass portion 2140. Each of the blades 2121 may extend from the same location on the hub or a location closer to the top or bottom of the hub 2160, relative to the axis of rotation 2101, or from central locations of the hub 2160. As shown in FIG. 12, the upstream blade 2132 may extend from the hub 2160 near the bottom and the downstream blade 2122 from near the top of the hub 2160.

The hub 2160 may further define a hub aperture 2165 to receive features of the motor assembly and a teeter aperture 2167 extending in a direction traverse to the axis of rotation 2101 and through the hub 2160. The hub aperture 2165 may be defined by the hub 2160 about the axis of rotation 2101. The hub aperture 2165 may extend entirely or partially through the height of the hub 2160. The hub aperture 2165 may be substantially circular and have a sufficient diameter to receive a feature to couple the asymmetric rotor 2120 to the motor assembly. For example, the hub aperture 2165 may receive a feature of the teeter assembly 2180, which will be subsequently described in greater detail. The teeter aperture 2167 may bisect through a width of the hub 2160 and the hub aperture 2165. The teeter aperture 2167 may be configured to receive a feature of the teeter assembly 2180, the motor assembly, or to receive a fastener configured to retain a feature of the teeter assembly 2180 or motor assembly within the hub aperture 2165.

The hub 2160 may be shaped to have an aerodynamic profile configured to reduce drag forces, as may be shown in FIG. 15B. The hub 2160 profile may be such that the hub 2160 experiences reduced drag forces when oriented in one direction as compared to other directions. From the mass portion 2140 to the hub 2160, the top surface of the asymmetric rotor assembly 2119 may maintain a relatively similar width while slowly increasing in height. The top surface may then extend along to the top surface of the downstream blade 2122. The bottom surface of the asymmetric rotor assembly 2119 may have a similar profile extending to the bottom surface of the upstream blade 2132. Between the downstream blade 2122 and upstream blade 2132, the hub 2160 may define an area of a narrower width, effectively creating channels for the air to pass around the hub 2160.

The hub 2160, upstream blade 2132 and downstream blade 2122, and the mass portion 2140 of the asymmetric rotor 2120 may be made from one or more materials. The materials may be the same or different for each section. For example, the asymmetric rotor 2120 may have a lightweight inner material 2130 and a stronger, or more resilient, outer material 2137. In one example, the asymmetric rotor 2120 may have a foam core and a carbon outer layer. The mount body 2163 may be a variety of more rigid materials and may be a metal, polymer, or other material. In some examples, the mount body 2163 may be made of the same materials as the blades 2121 and mass portion 2140, but may instead be configured to act as a more rigid body. As previously mentioned, the mass insert 2142 may be tungsten or another material having a density larger than that used for the remaining portion of the rotor assembly 2120 to have a comparably greater mass than the upstream blade 2132 and downstream blade 2122.

The asymmetric rotor assembly 2119 may further include a teeter assembly 2180. The teeter assembly 2180 may couple the asymmetric rotor 2120 to a motor assembly, such as motor assembly 140, or to another drive assembly. The teeter assembly 2180 may add one or more degrees of freedom to the asymmetric rotor assembly 2119 by adding an additional rotational axis, a teeter axis 2181. The teeter axis 2181 may be orthogonal or transverse to, the axis of rotation 2101 of the entire assembly 2119. In some examples, the teeter axis 2181 may define the bisecting line 2109 or may be parallel or coincident with the bisecting line 2109. The teeter assembly 2180 may allow the asymmetric rotor 2120 to tilt, or teeter, relative to the axis of rotation 2101 during operation. Because the asymmetric rotor 2120 is not symmetric with respect to the axis of rotation 2101, an imbalance of forces and moments relative to the axis of rotation 2101 may result, absent an additional degree of freedom. By tilting or teetering, the teeter assembly 2180 may assist the asymmetric rotor assembly 2119 in balancing forces between the blades 2121 and the mass portion 2140 relative to the axis of rotation 2101. The balancing may occur when the asymmetric rotors 2120 are rotating or when they are stationary, or both. For example, the droop 2108 in combination with the teeter assembly 2180 may allow for the blades 2121 to be positioned at a desired angle relative to the axis of rotation 2101. For example, in a balanced positioned the teeter assembly 2180 and the droop 2108 may position the latitudinal axis 2107 orthogonal to the axis of rotation 2101. Dynamic balancing may be described in greater detail below.

The teeter assembly 2180 may include a teeter shaft 2182, an axle 2187, and bushings 2189 or bearings, as best shown in FIG. 13B and 15B. The teeter shaft 2182 may couple with the motor assembly at one end and extend into the hub aperture 2165 of the hub 2160 at a second end. The second end may define an axle aperture that aligns with the teeter aperture 2167 of the hub 2160. The axle 2187 may extend through the teeter aperture 2167 and the axle aperture and be received by bushings 2189. In other examples, the bushings 2189 may be inserted into the teeter aperture 2167 and receive the axle 2187 at the axle aperture. In operation, The teeter shaft 2180 may supply power from the motor assembly to the asymmetric rotor 2120 and rotate around the axis of rotation 2101 with the asymmetric rotor 2120. The axle 2187 and the bushings 2189 may allow for rotation about the teeter axis 2181 and allow the asymmetric rotor 2120 to tilt relative to the axis of rotation 2101 during use. The teeter assembly 2180 may also allow the asymmetric rotor 2120 to tilt when stationary, such as during forward flight. Other arrangements of parts securing the teeter assembly 2180 to the asymmetric rotor assembly 2119 and allowing rotation about the teeter axis 2181 are envisioned as well.

In operation, the aerial vehicle 100 may activate a motor assembly, such as motor assembly 140 previously described, which may act to rotate the teeter shaft 2182. The teeter shaft 2182 may drive the hub 2160 in the rotational direction about the axis of rotation 2101. The movement of the hub 2160 may cause the blades 2121 to rotate, with the upstream blade 2132 leading the rotation and the downstream blade 2122 following. The mass portion 2140 may follow the movement of the blades 2121. During rotation, the teeter assembly 2180 may allow the asymmetric rotor assembly 2119 to balance relative to the axis of rotation 2101 for a range of rotational speeds. The rotation of the asymmetric rotor assembly 2119 and the shape of the blades 2121 may generate lift sufficient to support the aerial vehicle 100 in air.

The aerial vehicle 100 may include a forward propulsion system, such as the fixed wing configuration as shown by aerial vehicle 100 of FIG. 1. In such a system, the forward propulsion system may be activated and the motor assembly turned off. When the motor assembly is turned off, the asymmetric rotor assembly 2119 may begin to stop rotating. The drag force on the blades 2121 in forward flight may align the asymmetric rotor assembly 2119 in a forward flight position, with the mass portion 2140 in the direction of forward flight and the blades 2121 in a direction away from the direction of forward flight. The alignment may be automatic or passive (e.g. due to air forces) or accomplished by the movement of the motor assembly (e.g. actively moved by the motor assembly). The teeter assembly 2180 may assist in balancing the asymmetric rotor assembly 2119 in the forward flight position.

As the upstream blade 2132 and downstream blade 2122 rotate, they may induce helixes of air relative to the paths the blades 2121 take through air. As described herein, the downstream blade 2122 may operate in the helix formed from the operation of the upstream blade 2132. For example, as the asymmetric rotor 2120 rotates, the upstream blade rotation may induce a helix of air that generally travels in a direction along the axis of rotation 2101. The downstream blade 2122 may be axially spaced from the upstream blade 2132 along the direction of travel of the helix and, as a result, the downstream blade 2122 may encounter the helix generated by the upstream blade 2132 during rotation. The angular spacing 2110 may further position the downstream blade 2122 in the helix. For example, the downstream blade 2122 may encounter even less resistance or drag due to the operation of the downstream blade 2122 within the wake or helix of flow induced by the upstream blade 2132. Because the downstream blade 2122 encounters less resistance, the asymmetric rotor assembly 2120 as a whole may require less power to operate for a given rotational speed, and a corresponding lift. The angular spaced configuration 2110 of the upstream blade 2132 and the downstream blade 2122 may also improve efficiency because the blades 2121 can produce an equivalent amount of lift for a lower power consumption. For example, power consumption may be reduced by 15% when compared with conventional symmetrical orthogonally spaced blades 2121.

An additional feature of the asymmetric rotor assembly 2119 may be a reduced amount of noise and a reduced noise frequency generated during operation of asymmetric rotor assembly 2119. This may be accomplished by the positioning of the upstream blade 2132 relative to the downstream blade 2122, the positioning of the blades 2121 on one side of the axis of rotation 2101, and the inclusion of a mass portion 2140.

Generally, the operation of rotors produce noise as the blades, such as blades 2121, rotate through air. Both the total power and frequency of the noise produced by the blades 2121 may increase as the rate of rotation of a rotor, such as the asymmetric rotor 2120 increases. By positioning the upstream blade 2132 and downstream blade 2122 such that the downstream blade 2122 moves through air already disturbed by the upstream blade 2132, the amount of noise generated by the downstream blade 2122 and the asymmetric rotor assembly 2119 as a whole are reduced. Further, by reducing the numbers of blades 2121 on the asymmetric rotor 2120 and by positioning the upstream blade 2132 and the downstream blade 2122 on one side of the axis of rotation 2101, the blade pass frequency may be effectively reduced compared to a rotor with blades 2121 on both sides of the axis 2101. Further by utilizing less blades as compared to a conventional four-bladed symmetrical rotor, the blade pass frequency of the asymmetric rotor 2120 may be effectively reduced for a given rate of rotation of the rotor 2120 as a whole. For example, by utilizing two blades 2121 the blade pass frequency may be effectively halved as compared to a four-bladed symmetrical rotor even before accounting for the positioning of the two blades 2121 relative to each other. While the asymmetric rotor 2120 may require a greater rotational frequency due to the reduced numbers of blades 2121, the same amount of thrust, or thrust parity, may be achieved as compared to a conventional rotor at less than double the rotational frequency, resulting a net reduction in blade pass frequency. Further, with the blades 2121 oriented to a single side, the blades 2121 may rotate through space comparable to a single blade rotating through space once. In contrast, a symmetrical rotor with two blades would see a single blade rotate through the same space twice. Thus, by orienting the blades 2121 to a single side the blade pass frequency may be further reduced. In other embodiments, the rotor 2120 may include more than two blades 2121, but the blades 2121 may be arranged to be within 180 degrees of each other providing a similar noise reduction as compared to the two blade examples.

The reduction in the blade pass frequency may reduce the total power and the frequency of the noise generated. Lower frequency noises are often more acceptable to humans than higher frequency sounds, as lower frequency noises tend to blend into ambient noises. Thus, even if the total noise is not reduced there may be beneficial psychoacoustic effects, meaning beneficial changes in the way the noise itself is perceived by an individual. Additionally, lower frequency soundwaves of the same amplitude have less energy than higher frequency sounds of the same amplitude, and less energy results in less total noise. Further, positioning a mass portion 2140, rather than one or more additional blades 2121, to balance the forces generated by the blades 2121 may result in an asymmetric rotor assembly 2119 producing less noise than if additional blades 2121 were included because the mass portion 2140 may generates less noise than a blade. Additionally, the combination of the angular spacing 2110 and the axial offset 2103 of the downstream blade 2122 and the upstream blade 2132 may have certain combinative noise-reduction benefits. For example, in some cases, the non-orthogonal and axially offset combination may provide a greater noise-reduction benefit than the mere additive noise-reduction benefits provided by a non-orthogonal arrangement and an axial offset 2103 arrangement taken in isolation.

Additionally, the asymmetric rotor assembly 2119 may be capable of automatically orienting to a reduced drag position when the asymmetric rotor assembly 2119 is not being used to generate lift to support the aerial vehicle 100, such as during forward flight. For example, during forward flight the movement of the aerial vehicle 100 through air or wind may result in aerodynamic forces, such as a lift and drag forces, as well as mass and inertial related forces on the asymmetric rotor 2120. The asymmetric rotor assembly 2119 may also be oriented by the motor assembly. As previously described, the hub 2160 may have a reduced drag profile with the mass portion 2140 oriented in the forward flight direction. Additionally, the mass portion 2140 may be configured to assist in reducing drag forces on the asymmetric rotor assembly 2119 when oriented in the forward flight direction. For example, the droop 2108 of the mass portion 2140 may create a more aerodynamic profile resulting in reduced drag forces on the asymmetric rotor assembly 2119. Positioning the blades 2121 rearward of the mass portion 2140 may also reduce the drag forces blades 2121 and on the asymmetric rotor assembly 2119 as a whole. As a result, when forward flight is initiated the asymmetric rotor assembly 2119 may rotate about the axis of rotation 2101 to the forward flight position due to the reduced drag forces in this position. This automatic alignment may be possible without the assistance of the motor assembly and may reduce the need for a components in the motor assembly. Further, the teeter assembly 2180 may help to balance forces or moments resulting from forces, such as the aerodynamic forces, on the asymmetric rotor assembly 2119 during flight by allowing the asymmetric rotor 2120 to rotate about the teeter axis 2181. For example, a certain orientation of the mass portion 2140 relative to the blades 2121 about the teeter axis 2181 may result in a reduced drag forces. The teeter assembly 2180 may also assist in balancing forces or moments on the mass portion 2140 with the moments or forces on the blades 2121 relative to the axis of rotation 2101. Having a position that experiences reduced drag forces may reduce instances of windmilling, meaning uncontrolled or non-desired rotation of the rotor assembly 2119, during forward flight. The reduced drag, reduction of components in the motor assembly, or reduction in windmilling may each or together reduce power consumption or weight of the unmanned aerial vehicle 100, which may allow for longer flight times or faster flight speeds.

The asymmetric rotor assembly 2119 may also reduce a footprint of the asymmetric rotor assembly 2119. For example, an aerial vehicle 100 may include four asymmetric rotors 2120. The asymmetric rotors 2120 may be aligned with the upstream blades 2132 and the downstream blades 2122 toward the aerial vehicle 100. In that orientation, with the mass portions 2140 extending outward, the reduced footprint may reduce a required storage or shipping volume necessary to store the aerial vehicle 100.

During rotation, the teeter assembly 2180 may also assist in balancing forces and moments about the axis of rotation 2101. The forces may include aerodynamic related forces, including lift and drag forces, on the asymmetric rotor 2120, as well as mass or inertial forces resulting from the mass of the asymmetric rotor 2120 in motion. The moments may include moments resulting from the above forces at a location on the asymmetric rotor 2120 spaced from the axis of rotation 2101. In operation, the teeter assembly 2180 may allow for a change in the angle of the asymmetric rotor 2120 relative to the latitudinal axis 2107 such that a moment on the mass portion 2140 is similar to a moment of the blades 2121 relative to the axis of rotation 2101. In other examples, the teeter assembly 2180 may alternatively, or additionally, act to balance forces or moments on the blades 2121 with the forces or moments on the mass portion 2140, relative to the rotational axis 2101. The teeter assembly 2180 may assist in self-balancing of the asymmetric rotor 2120, because the teeter assembly 2180 and asymmetric rotor 2120 may be configured such that the asymmetric rotor 2120 moves about the teeter axis 2181 to a position where forces balance relative to the axis of rotation 2101, as will be described in greater detail below. Self-balancing may again reduce power consumption and reduce or eliminate the need for some components in the motor assembly to balance the asymmetric rotor assembly 2119.

Figure 16A:
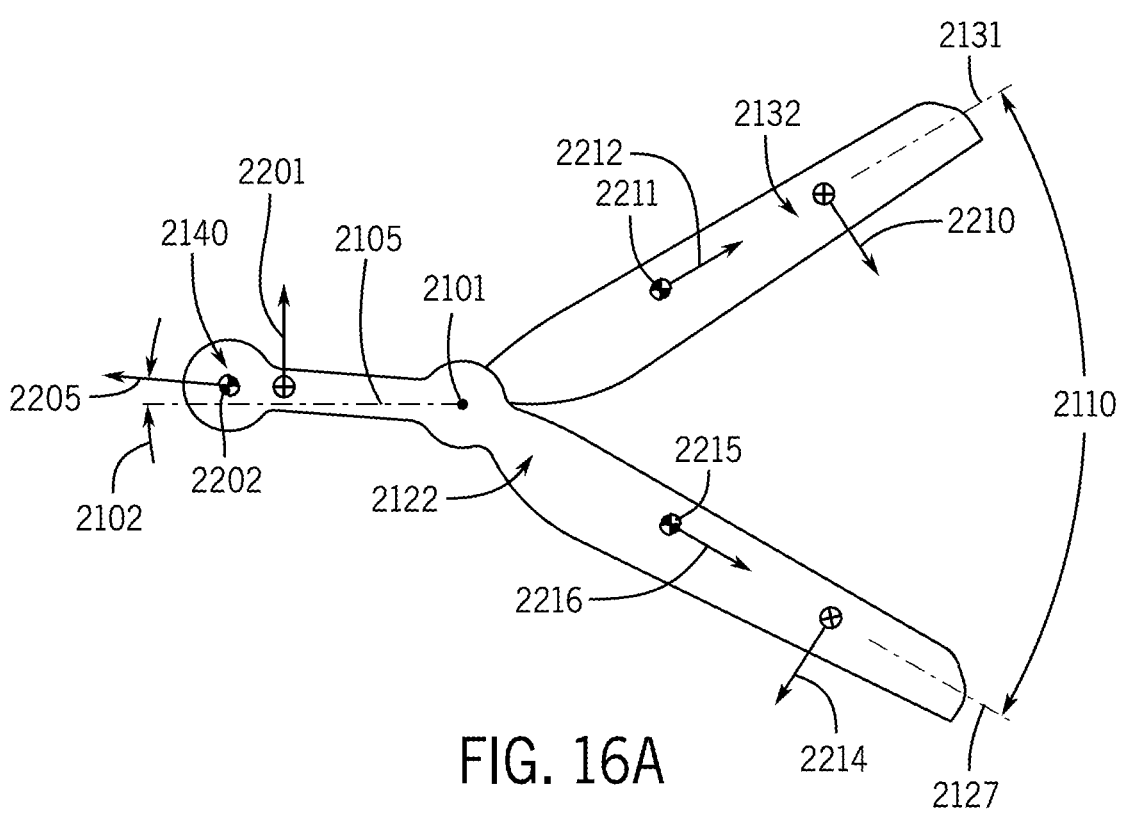
FIG. 16A depicts a top plan view of an example asymmetric rotor assembly showing forces on the asymmetric rotor assembly.
Figure 16B:
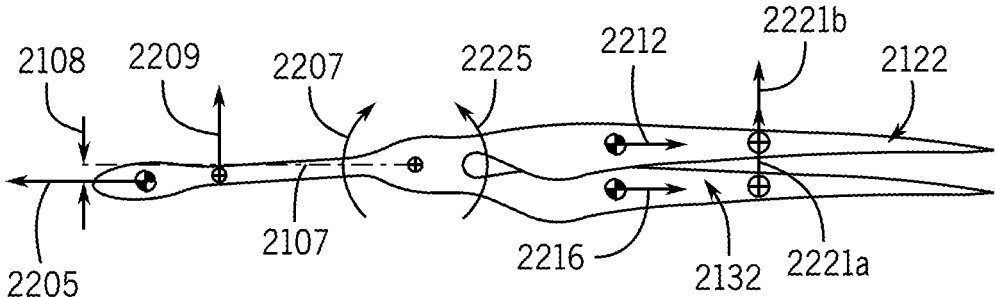
FIG. 16B depicts a left elevation view of an example asymmetric rotor assembly showing forces and moments on the asymmetric rotor assembly.

With continued reference to the asymmetric rotor assembly 2119 as shown in FIGS. 12-15B, additional reference will be made to FIG. 16A-16B showing force diagrams including illustrative forces and moments on the asymmetric rotor assembly 2119 and subsequent balance during operation. FIG. 16A shows forces that may be generally in directions transverse with the axis of rotation 2101, while FIG. 16B shows forces that may be generally in the plane with the axis of rotation 2101 that generate a moment about the axis of rotation 2101, which may be representative of the forces during operation. The forces shown in FIG. 16A-B may be described in relation to the force experienced at or in relation to the axis of rotation 2101 of the asymmetric rotor 2120.

Generally, drag forces are proportional to the air speed relative to the object experiencing the drag forces. At higher speeds, which the asymmetric rotor assembly 2119 may generally operate at, drag forces may be proportional to air speed squared. Drag forces may generally be in a direction opposite to the movement of an object. Inertial or mass related forces of a rotating object are also generally proportional to the speed of the object squared. Thus, for a rotating object, drag forces are generally proportional to inertial forces.

Turning to FIG. 16A, the asymmetric rotor assembly 2119 is shown as rotating counterclockwise about the axis of rotation 2101. FIG. 16A may exemplify how the offset of the mass portion 2140 assists in balancing drag forces on the upstream blade 2132 and downstream blade 2122 relative to the axis of rotation 2101. During rotation, the mass inertial forces 2205 of the mass portion 2140 extend outward from the mass center of gravity 2202 and away from the axis of rotation 2101. Because the mass portion 2140 has a lag 2102 relative to the longitudinal axis 2105, the inertial forces 2205 are angularly offset from the longitudinal axis 2105. The drag forces 2201 on the mass portion 2140 are generally oriented in a direction perpendicular to the mass portion 2140 and in a direction opposite the direction of rotation.

The upstream inertial forces 2212 extend along the upstream orientation 2131 away from the center of gravity 2211 of the upstream blade 2132. The upstream drag forces 2210 are generally oriented in a direction perpendicular and opposite to the direction of rotation of the upstream blade 2132. The downstream inertial forces 2216 extend along the downstream orientation 2127 away from the center of gravity 2215 of the downstream blade 2122. The downstream drag forces 2214 are generally oriented in a direction perpendicular and opposite to the direction of rotation of the downstream blade 2122. As previously discussed, the downstream drag forces 2214 may be less than the upstream drag forces 2210 due to the downstream blade 2132 following in the helix of the upstream blade 2132.

Explanation will now be given as to how the forces shown in FIG. 16A balance. The resultant inertial force vector of the upstream blade 2132 and downstream blade 2122 may generally be parallel to the longitudinal axis 2105, as the magnitude of the inertial forces and their spacing from the longitudinal axis 2105 are equal. Because the upstream drag force 2210 may be greater than the downstream drag force 2214, the resultant blade drag force vector is generally oriented in a direction away from both the axis of rotation 2101 and towards the downstream orientation 2127 from the longitudinal axis 2105. With reference to FIG. 16A, the resultant blade drag force vector may extend down and to the right with respect to FIG. 16A. The resultant blade force vector of the inertial and drag forces of the blades 2121 may thus be oriented away from the axis of rotation 2101 and the longitudinal axis 2105. Because the mass portion 2140 has a lag 2202, the mass drag force 2201 and the mass inertial force 2205 define a resultant mass force vector extending away from the axis of rotation 2101 and the longitudinal axis

2105, generally up and to the left with respect to FIG. 16A, or generally opposite the resultant blade force vector. Because the resultant mass force vector and the resultant blade force vector may be oriented in generally opposite directions, the mass force vector may balance the blade force vector relative to the axis of rotation 2101 for a given mass inertial force. The mass insert 2142 and the lag 2102 of the mass portion 2140 may be selected to generate a sufficient inertial force to balance the blade force vector. The droop 2108 may also assist in orienting the mass force vector. Because the inertial force of a rotating body is generally proportional to drag forces, the forces of the blades 2121 and the mass portion 2140 may generally balance relative to the rotational axis 2101 for a range of rotational speeds.

Turning to FIG. 16B, a moment may be induced on a body about a point when a force is applied to the body at a distance from that point. Further, a rotating body about a fixed axis may generate a torque orthogonal to the direction of rotation of the body due to rotational acceleration and, or aerodynamic forces. FIG. 16B shows forces and moments in the direction of the axis of rotation which may be representative of the forces experienced on the asymmetric rotor assembly 2119 at operation. An airfoil moving through space, such as the upstream blade 2132 and downstream blade 2122, generates thrust forces 2221 that may be induced on the blades 2121. As shown in FIG. 16B, the thrust forces 2221a generated by the upstream blade 2132 and the thrust forces 2221b generated by the downstream blade 2122 may generate a blade moment 2225 counterclockwise about the axis of rotation 2101.

Because the mass portion 2140 is offset from the latitudinal axis 2107, the mass portion 2140 generates a torque 2209 extending away from the axis of rotation 2101 and towards the latitudinal axis 2107. The inertial force 2205 extends away from the latitudinal axis 2107 and the axis of rotation. The torque 2209 and inertial force 2205 generate a mass moment 2207 in a clockwise direction, opposite the direction of the blade moment 2225. Because torque 2209 and the thrust forces 2221 are both proportional to the rotational speed of the asymmetric rotor assembly 2119, the droop 2108 of the mass portion 2140 and the weight of the mass insert 2142 may be tuned such that the torque 2209 and inertial force 2205 of the mass portion 2140 balance with the blade moment 2225 from by the downstream thrust 2221b and upstream thrust 2221a. Further, the teeter assembly 2180 may assist in balancing the blade moment 2225 and the mass moment 2207 by allowing the asymmetric rotor 2120 to rotate about the teeter axis 2181 and change orientation relative to the latitudinal axis 2107. By teetering, the inertial forces 2212, 2216 of the blades 2121 and mass portion 2140 may add to or reduce the moments generated by the mass portion 2140 or the blades 2121. In additional examples, the mass portion 2140 may generate a thrust force 2221 and the mass portion 2140 may again be tuned to account for additional thrust from the mass portion 2140. Thus, the teeter assembly 2180 and the mass portion 2140 may allow for the use of an asymmetrical rotor 2120 that may be more efficient than conventional orthogonally spaced symmetrical rotors.

As can be understood, any of the features of the rotor assembly 120 can be incorporated into the features of the rotor assembly 2119 and vice versa as embodiments of the present disclosure relate to reduced-noise rotor assemblies and methods of use that may include improved configurations and components for rotor assemblies. For example, the rotor assembly 2119 may include a similar arrangement as rotor assembly 120 such as blades axially spaced similarly to upstream blade 132 and downstream blade 122. Rotor assembly 2119 may also include motor assembly 140 and/or related elements such as the biasing element 160 to assist in rotating or aligning the rotor assembly 2119. Relatedly, although the discussion presented herein is related to rotor assemblies for aerial vehicles and unmanned aerial vehicles, embodiments may be applicable to other assemblies utilizing rotating blades such as windmills, boat propellers, and other devices.

Other examples and implementations are within the scope and spirit of the disclosure and appended claims. For example, features implementing functions may also be physically located at various positions, including being distributed such that portions of functions are implemented at different physical locations. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

The above specification, examples and data provide a complete description of the structure and use of exemplary embodiments of the invention as defined in the claims. Although various embodiments of the claimed invention have been described above with a certain degree of particularity, or with reference to one or more individual embodiments, other embodiments using different combinations of elements and structures disclosed herein are contemplated, as other iterations can be determined through ordinary skill based upon the teachings of the present disclosure. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. An aerial vehicle comprising:
a rotor assembly comprising:
 a downstream blade,
 an upstream blade, the downstream blade and the upstream blade configured to rotate about an axis of rotation, and
 a blade shaft coupled with the downstream blade and the upstream blade defining a keyed pathway extending along and at least partially about the axis of rotation, the blade shaft configured to rotate about the axis of rotation; and
 wherein
 the downstream blade is arranged extending outward from the axis of rotation along a downstream blade orientation and the upstream blade is arranged extending outwards from the axis of rotation along an upstream blade orientation that is non-orthogonal to the downstream blade orientation, and
 one of the downstream blade or the upstream blade is movable relative to the other of the downstream blade or the upstream blade longitudinally along the axis of rotation by the keyed pathway.

2. The aerial vehicle of claim 1, wherein the downstream blade is axially offset along the axis of rotation relative to the upstream blade, and the upstream blade defines a leading edge of the rotor assembly.

3. The aerial vehicle of claim 2, wherein the downstream blade orientation is spaced from the upstream blade orientation about the axis of rotation by an angular spacing.

4. The aerial vehicle of claim 2, wherein the downstream blade and the upstream blade are axially offset by between 1% to 10% of a diameter of the rotor assembly.

5. The aerial vehicle of claim 2, wherein the downstream blade is positioned below the upstream blade.

6. The aerial vehicle of claim 3, wherein the angular spacing is between 15° and 75°.

7. The aerial vehicle of claim 3, wherein:
the rotor assembly is configured to maintain the angular spacing during rotation of the downstream blade and the upstream blade about the axis of rotation, and
in response to a cessation of the rotation of the downstream and upstream blades, the angular spacing changes relative to the angular spacing during rotation.

8. The aerial vehicle of claim 3, wherein
the upstream blade induces a first helix of airflow during rotation about the axis of rotation,
the downstream blade induces a second helix of airflow during rotation about the axis of rotation, and
the angular spacing and the axial offset cooperate to limit noise of the rotor assembly by aligning the second helix of airflow within a wake of the first helix of airflow.

9. The aerial vehicle of claim 3, wherein the angular spacing reduces noise output by the rotor assembly by separating an amplitude of a first tone output by the upstream blade and an amplitude of a second tone output by the downstream blade such that the amplitudes of the first and second tones, respectively, are not additive at the same frequency bands of each tone.

10. The aerial vehicle of claim 1, wherein the rotor assembly further comprises
a motor shaft configured to rotate about the axis of rotation, the upstream blade fixed to the motor shaft, and
the blade shaft is a rotor shaft keyed to one or both of the upstream blade or the motor shaft for rotating about the axis of rotation with the upstream blade, the downstream blade fixed to the rotor shaft.

11. The aerial vehicle of claim 10, wherein, in response to a cessation of the rotation of the downstream blade and the upstream blade about the axis of rotation, the rotor shaft is configured to change an axial offset between the downstream blade and the upstream blade.

12. The aerial vehicle of claim 11, wherein in response to a cessation of the rotation of the downstream and upstream blades about the axis of rotation, the rotor shaft rotationally retracts to a lower stop position at which the downstream blade orientation is substantially parallel with the upstream blade orientation.

13. The aerial vehicle of claim 1, wherein each of the upstream blade and the downstream blade define a varying pitch having a first pitch at a first location from the axis of rotation different from a second pitch at a second location from the axis of rotation, wherein the first location is spaced from the second location.

14. The aerial vehicle of claim 1, wherein,
in a first compact configuration, the rotor assembly maintains the downstream blade and the upstream blade are within a footprint of one another relative to the axis of rotation, and
in a second deployed configuration, the rotor assembly maintains the downstream blade is at least partially outside of a footprint of the upstream blade relative to the axis of rotation.

15. The aerial vehicle of claim 14, wherein, in the second deployed configuration, the rotor assembly maintains the downstream blade non-orthogonal to the upstream blade.

16. The aerial vehicle of claim 14, wherein, in the first compact configuration, the downstream and upstream blades are stacked relative to, and contacting, one another, and in the second deployed configuration, the downstream blade is axially offset from the upstream blade relative to the axis of rotation.

17. The aerial vehicle of claim 14, wherein the blade shaft is fixed to the downstream blade, and at least one of the upstream blade or the downstream blade are biased toward the first compact configuration.

18. The aerial vehicle of claim 17, wherein a rotation of the downstream blade and the upstream blade by the rotor assembly overcomes the bias such that the downstream blade is maintained at least partially outside of the footprint of the upstream blade relative to the axis of rotation.

19. The aerial vehicle of claim 14, wherein the rotor assembly further comprises a motor shaft configured to rotate about the axis of rotation, the upstream blade fixed to the motor shaft, the blade shaft is a rotor shaft, and defines the keyed pathway with, one or both of the upstream blade or the motor shaft, and the rotor shaft is rotationally extendable from the one or both of the upstream blade or the motor shaft along the keyed pathway to an upper stop position at which the downstream blade is non-orthogonal to, and axially offset from, the upstream blade.

\* \* \* \* \*